(12) United States Patent
Andoh et al.

(10) Patent No.: US 8,279,495 B2
(45) Date of Patent: Oct. 2, 2012

(54) IMAGE FORMING APPARATUS HAVING COVER LOCK DEVICE

(75) Inventors: Takayuki Andoh, Kanagawa-ken (JP); Takuji Takahashi, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 465 days.

(21) Appl. No.: 12/458,571

(22) Filed: Jul. 16, 2009

(65) Prior Publication Data

US 2010/0014129 A1  Jan. 21, 2010

(30) Foreign Application Priority Data

Jul. 16, 2008  (JP) ................. 2008-184750

(51) Int. Cl.
*H04N 1/04* (2006.01)
*H04N 1/40* (2006.01)

(52) U.S. Cl. ........ 358/471; 358/401; 358/474; 358/497; 358/296

(58) Field of Classification Search .................. 399/380, 399/379, 211, 212, 109; 358/400, 401, 500, 358/501, 471, 474, 497, 296; 250/239
See application file for complete search history.

(56) References Cited

U.S. PATENT DOCUMENTS

| | | | |
|---|---|---|---|
| 2006/0222435 A1* | 10/2006 | Ha et al. | 400/691 |
| 2007/0018788 A1* | 1/2007 | Taniguchi | 340/5.64 |
| 2007/0279888 A1 | 12/2007 | Nanno et al. | |
| 2008/0180762 A1* | 7/2008 | Andoh et al. | 358/498 |
| 2008/0181695 A1* | 7/2008 | Andoh et al. | 399/361 |
| 2008/0181698 A1* | 7/2008 | Andoh et al. | 399/405 |
| 2008/0291501 A1* | 11/2008 | Shiraki et al. | 358/401 |

FOREIGN PATENT DOCUMENTS

| | | |
|---|---|---|
| JP | 9-114167 | 5/1997 |
| JP | 2001-022143 | 1/2001 |
| JP | 3644376 | 2/2005 |
| JP | 2006-065188 | 3/2006 |
| JP | 2006-119474 | 5/2006 |

OTHER PUBLICATIONS

An English language abstract of Japanese Publication No. JP 2001-242563, published Sep. 7, 2001.

* cited by examiner

*Primary Examiner* — Cheukfan Lee
(74) *Attorney, Agent, or Firm* — Harness, Dickey & Pierce, P.L.C.

(57) ABSTRACT

An image forming apparatus includes an apparatus casing installing an image formation section, an upper cover member that swingably covers and uncovers the apparatus casing, and an image reading unit supported by the apparatus casing via the upper cover member. A lock device is provided to maintain the upper cover member in a closed state. An unlock device is provided to unlock the lock device. An unlock operation section is displaced by an operator and activates the unlock device to operate when the lock device is unlocked. An unlock operation invalidating mechanism is provided to invalidate an unlock operation executed through the operation section by interrupting transmission of the displacement of the operation section to the lock device when unlock is prohibited.

5 Claims, 24 Drawing Sheets

FIG. 17
(a)
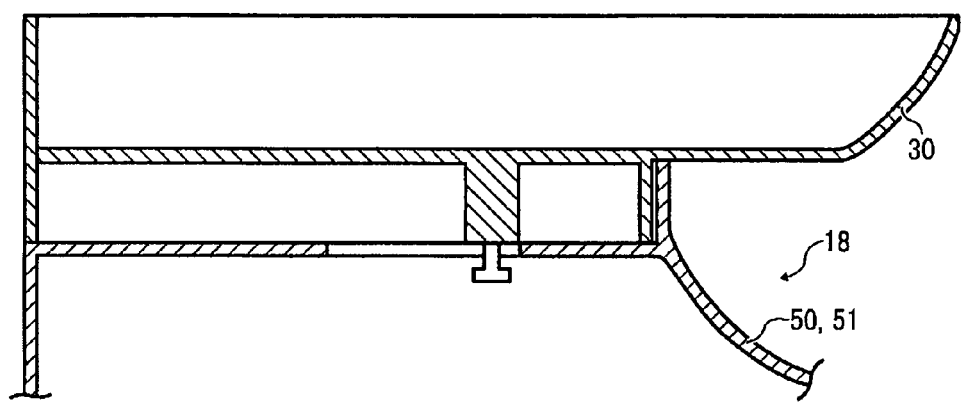
(b)
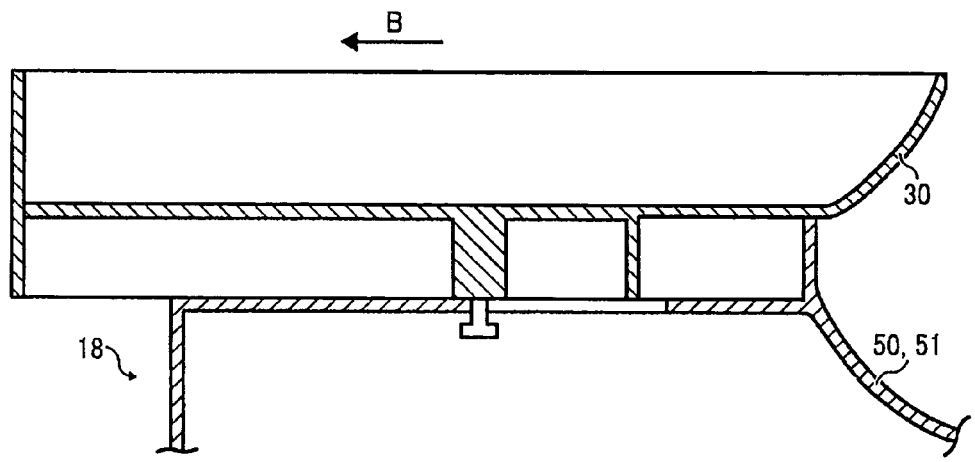

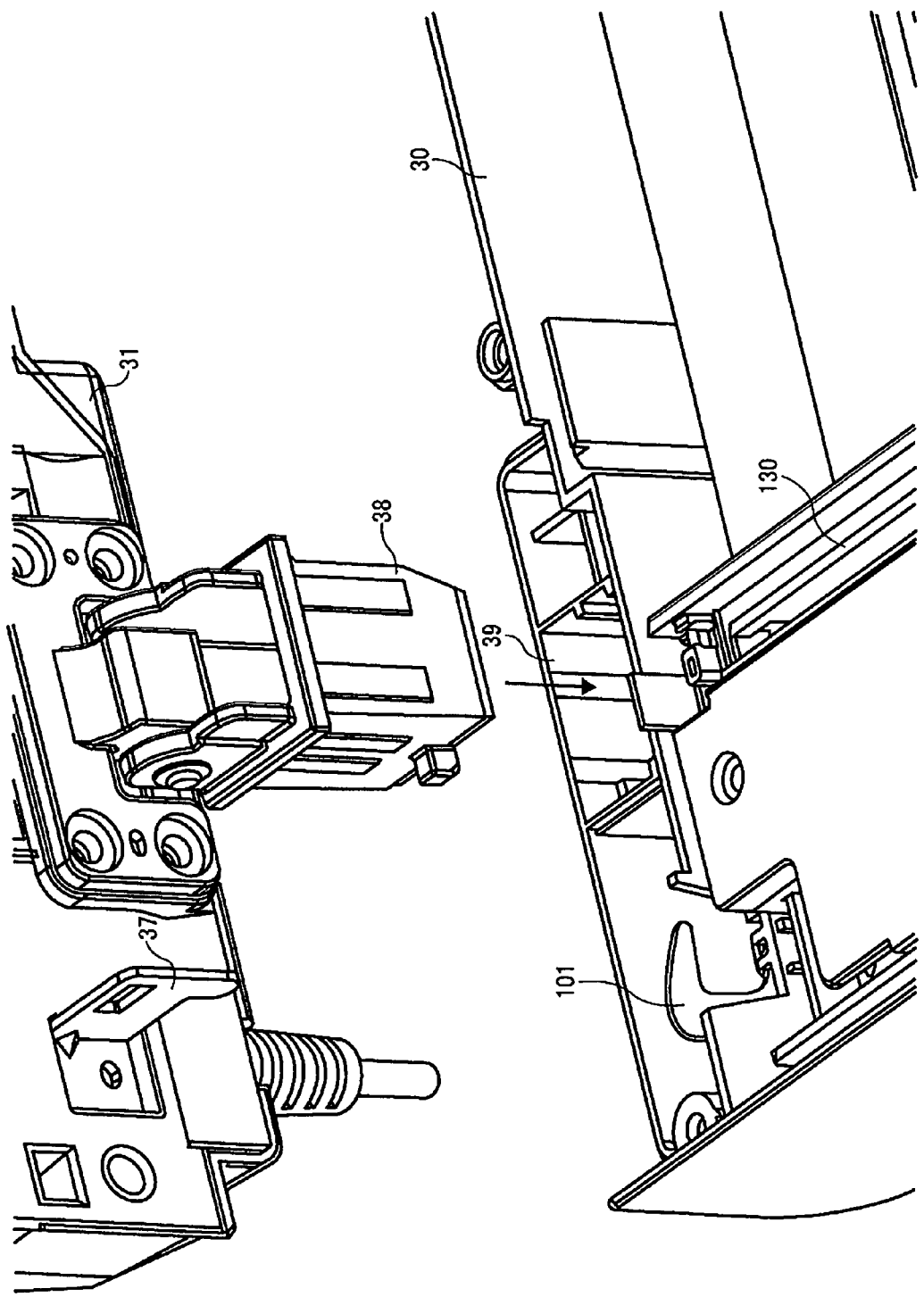

IMAGE FORMING APPARATUS HAVING COVER LOCK DEVICE

CROSS REFERENCE TO RELATED APPLICATION

This application claims priority under 35 USC §119 to Japanese Patent Application No. 2008-184750, filed on Jul. 16, 2008, the entire contents of which are herein incorporated by reference.

BACKGROUND OF THE INVENTION

1. Field of the Invention

The present invention relates to an image forming apparatus, such as a copier, a facsimile, a printer, a multifunctional machine at least having two functions of these apparatuses, etc.

2. Discussion of the Background Art

A sheet internally ejecting type image forming apparatus, in which an image reading unit is mounted above an image printing unit at a prescribed interval, is well-known. Also well-known is an upper cover member that supports an image reading device and is upwardly swingable to allow accessing to the inside of the image printing section and maintenance or replacement of the consumables or the like. In such an image forming apparatus, when an operation section is regarded as a front side and the upper cover member swings around a rotational shaft arranged at the rear side of the apparatus, the front side of the apparatus is open, whereby maintenance or the like becomes convenient. Similarly, a platen cover provided to the image reading device so as to depress an original document also swings in the same direction as the upper cover member.

In such an image forming apparatus, when the upper cover member is open in addition to the platen cover, the platen cover is largely open and possibly drops by its own gravity or bumps into surroundings. Because, the platen cover is integrally arranged above the upper cover.

Then, the Japanese Patent Registration No. 3, 644,376 proposes an image forming apparatus capable of preventing the upper cover and the platen cover from being simultaneously open using a lock device.

However, usability is not excellent. Because, a handle is used to switch from locking to unlocking of the platen cover vice versa. Further, since the handle is secured to a body at the time of the locking, rigidity of parts needs be increased expecting application of an unreasonable force.

SUMMARY OF THE INVENTION

In view of the above, it is an object of the present invention to resolve the mentioned and the other problems and provide a new and noble image forming apparatus including a cover lock device.

Such a new and noble image forming apparatus includes an apparatus casing installing an image formation section, an upper cover member that swingably covers and uncovers the apparatus casing, and an image reading unit supported by the apparatus casing via the upper cover member. A lock device is provided to maintain the upper cover member in a closed state. An unlock device is provided to unlock the lock device. An unlock operation section is operated and displaced by an operator and activates the unlock device to operate when the lock device is unlocked. An unlock operation invalidating mechanism is provided to invalidate an operation of the operation section by interrupting transmission of the displacement of the operation section to the lock device when unlock is prohibited In another embodiment, the image reading unit includes an original document depressing member that swingably opens and closes an original document placing surface in the same direction as the upper cover member. The unlock operation invalidating device invalidates the operation executed through the unlock operation section when the original document depressing member is open.

In yet another embodiment, the original document depressing member is configured to rise from the original document placing surface, and wherein said unlock operation invalidating mechanism invalidates the unlocking operation when the original document depressing member is rising from the original document placing surface.

In yet another embodiment, the unlock operation invalidating mechanism includes a swinging member that swings between a non-unlock position where the transmission of the displacement of the unlock operation section to the lock device is interrupted and an unlock position where the transmission of the displacement is not interrupted. A swing operation member engages with the swinging member at its one end and configured to activate the swinging member. A linking member engages with the other end of the swing operation member and transfers one of the opening and rising movements of the original document depressing member to the swing operation member. The swinging member is swung by the swing operation member between the non-unlock and unlock positions in accordance with a condition of the original document depressing member.

In yet another embodiment, the image reading device is slidably movable by a prescribed length together with the linking member in relation to the upper cover member. The swing operation member includes a lengthy member having a length more than the prescribed length. The linking member always engages with the lengthy member wherever the image reading device is slidably moved.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein:

FIG. 17A is a cross sectional view illustrating the drop out prevention section preventing an image reading device from dropping out in a detaching direction when the image reading device does not slide in the support section in an initial condition;

FIG. 17B is a cross sectional view illustrating the drop out prevention section preventing an image reading device from dropping out in a detaching direction when the image reading device slides in the support section by the maximum stroke amount;

FIG. 28 is a perspective view illustrating an exemplary hinge section attached to the platen cover.

DESCRIPTION OF THE PREFERRED EMBODIMENTS

Figure 1:
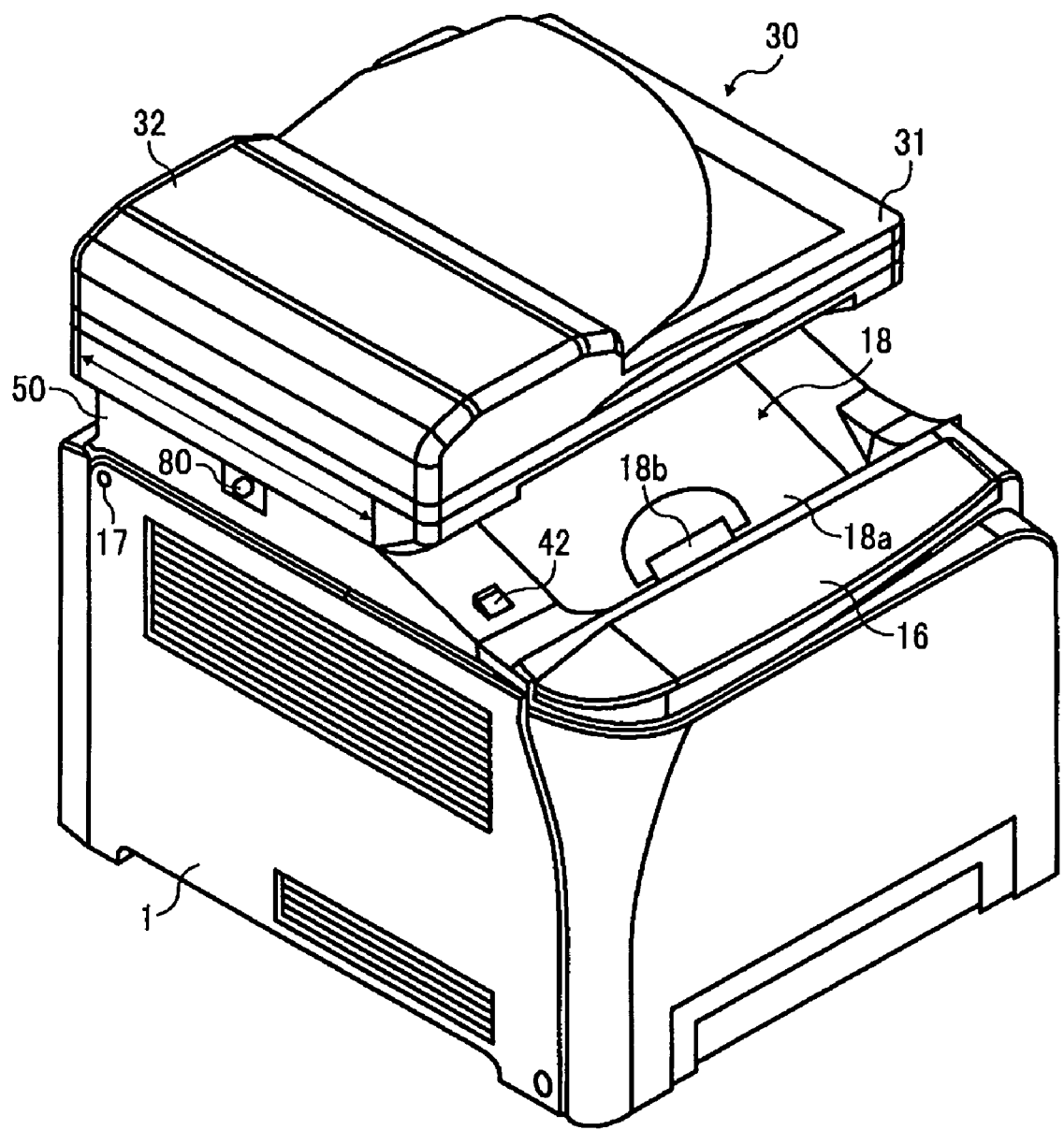
FIG. 1 is a schematic perspective view illustrating an exemplary image forming apparatus according to one embodiment of the present invention.
Figure 2:
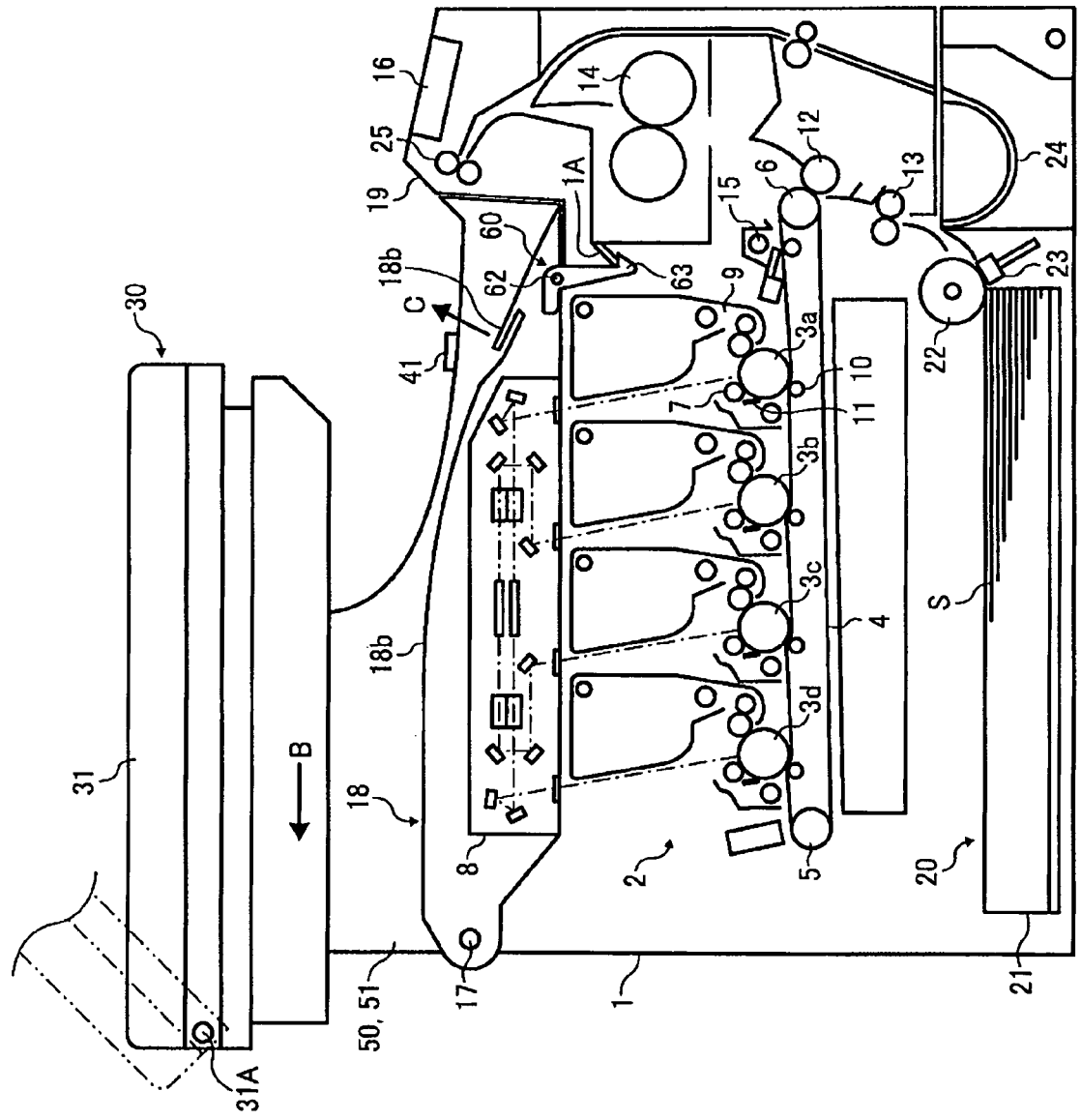
FIG. 2 is a schematic vertical cross sectional view illustrating an exemplary interior structure of the image forming apparatus.

Referring now to the drawings, wherein like reference numerals and marks designate identical or corresponding parts throughout several figures, in particular in FIGS. 1 and 2, an image printing section 2 is arranged in the middle of an apparatus body 1 of a tandem type color image forming apparatus. A sheet feeding section 20 is provided below the image printing section to feed a sheet for receiving an image formed in the image printing section 2. An image reading device 30 is arranged above the image printing section 2.

In the image printing section 2, plural drum type photoconductive members 3a to 3d are included as an image bearer to form different color toner images, respectively. As shown, yellow, cyan, magenta, and black toner images are formed on the surfaces of the photoconductive members 3a to 3d, respectively. These photoconductive members 3a to 3d are arranged in parallel to each other at a prescribed interval. An intermediate transfer belt 4 is arranged below opposing the photoconductive members 3a to 3d as an intermediate transfer member. The intermediate transfer member can be a drum type, but an endless belt can be wound around plural supporting rollers 5 and 6 and is driven counter clockwise in the drawing.

Around the photoconductive member 3, there are provided a charge device 7 that charges the surface of the photoconductive member, an optical scanning device (LSU) 8 that emits a laser light with image information to the surface of the photoconductive member, a developing device 9 that visualizes a latent image formed on the surface of the photoconductive member 3 by means of exposure, a transfer device 10 opposing the photoconductive member 3 via the intermediate transfer belt 4, and a cleaning device that removes and collects toner remaining on the surface of the photoconductive member 3 after the transfer process onto the intermediate transfer belt 4.

When image formation is started in the image forming apparatus, the photoconductive member 3 is driven and rotated clockwise in FIG. 2, and the surface of the photoconductive member 3 is charged in a prescribed polarity by the charge device 7. Then, to the charged surface, the laser light is emitted from the optical scanning device 8 in accordance with the image information, thereby a latent image is formed on the photoconductive member 3. The latent image is then visualized into a toner image by the developing device 9. The toner image is then transferred onto the intermediate transfer belt 4 by the transfer device 10.

During the color image formation, all of the above-mentioned image formation operations are executed on the photoconductive members 3, and then respective yellow to black toner images are superimposed one after another on the intermediate transfer belt 4. Further, a secondary transfer roller 12 is arranged opposing the supporting rollers 6 via the intermediate transfer belt 4 in the image forming apparatus.

In the sheet feeding section 20 arranged below the image printing section 2, a sheet feeding tray 21 as a sheet container section for stacking sheets S such as a transfer sheet, a resin film, etc., is provided. Also provided are a sheet feeding roller 22 for launching the sheets S stacked on the sheet feeding tray 21, a friction pad 23 serving as a separation device for separating the double feed sheets into one, and a re-conveyance path used for conveying the sheet S again during a duplex image formation or the like.

The sheet S fed from the sheet feeding section 20 is launched toward a registration roller 13, and bumps into a stopping registration roller 13 at its leading end. Thus, the sheet s is aligned. Then, the registration roller 13 starts rotating and launches the sheet S toward the secondary transfer section at a prescribed time so that the leading end of the sheets S coincides with a color toner image formed on the intermediate transfer belt 4 at the secondary transfer section in which the secondary transfer roller 12 is arranged.

The sheets receiving the non-fixed toner image at the secondary transfer section is conveyed to a fixing section 14. When the non-fixed toner image is fixed onto the sheet S, the sheet S is ejected onto a sheet stacking section 18a arranged on the upper surface of the apparatus body 1 via a sheet ejection section 25. The toner sticking and remaining on the surface of the intermediate transfer belt 4 after the toner image transfer process is removed by a cleaner 15 for belt use.

Even not shown, the image reading device 30 includes a platen serving as an original document placing section on which an original document is placed, a platen cover serving as an original document depressing member foe covering the platen, an automatic original document feeding device 32 integrally arranged with the platen cover 31, and an original document scanning section (not shown) capable of reading the original documents manually set and fed by the automatic document-feeding device 32 onto the platen.

Numeric number 16 denotes a control panel for operating the image reading device 30 and the image printing section 2. The control panel 16 side serves as a front side of the image forming apparatus. A sheet ejection section 25 is arranged at the front side of the apparatus body 1, and the sheets ejected from the sheet ejection section 25 to sheet stacking section 18a, i.e., from front side to the rear side, when viewed from the front side.

An upper cover member 18 is arranged above the apparatus body 1. The upper surface of the upper cover member 18 is used as a sheet stacking section 18a. The image reading device 30 is arranged above the upper cover member 18 with an appropriate interval while being supported by first and second supporting sections 50 and 51 arranged on the left and right side of the apparatus when viewed from the front side thereof. Accordingly, the sheet stacking section 18a is covered by the image reading device 30 to provide an internal sheet ejection type system is provided.

In the internal sheet ejection type image forming apparatus, visibility at the sheet stacking section 18a and withdrawal of the sheets therefrom are restricted. Then, the image reading device 30 is supported by the first and second supporting sections 50 and 51 omitting the supporting section at a rear side of the upper cover member 18. As a result, a light can enter not only from the front side but also from the rear side, thereby a light letting in performance is improved. In addition, even a lengthy sheet is used and ejected, the sheet can be stacked partially falling over the rear side of the apparatus body across the sheet stacking section 18a.

Further, to improve sheet extraction performance and visibility the image reading device 30 is slidably supported in a direction as shown by an arrow B of FIG. 1, and is slid toward the rear side, an interval from the sheet ejection section 25 on the apparatus body side to the image reading device 30 can be extended. Thus, a user having big hands can smoothly perform the sheet extraction operation.

Figure 3:
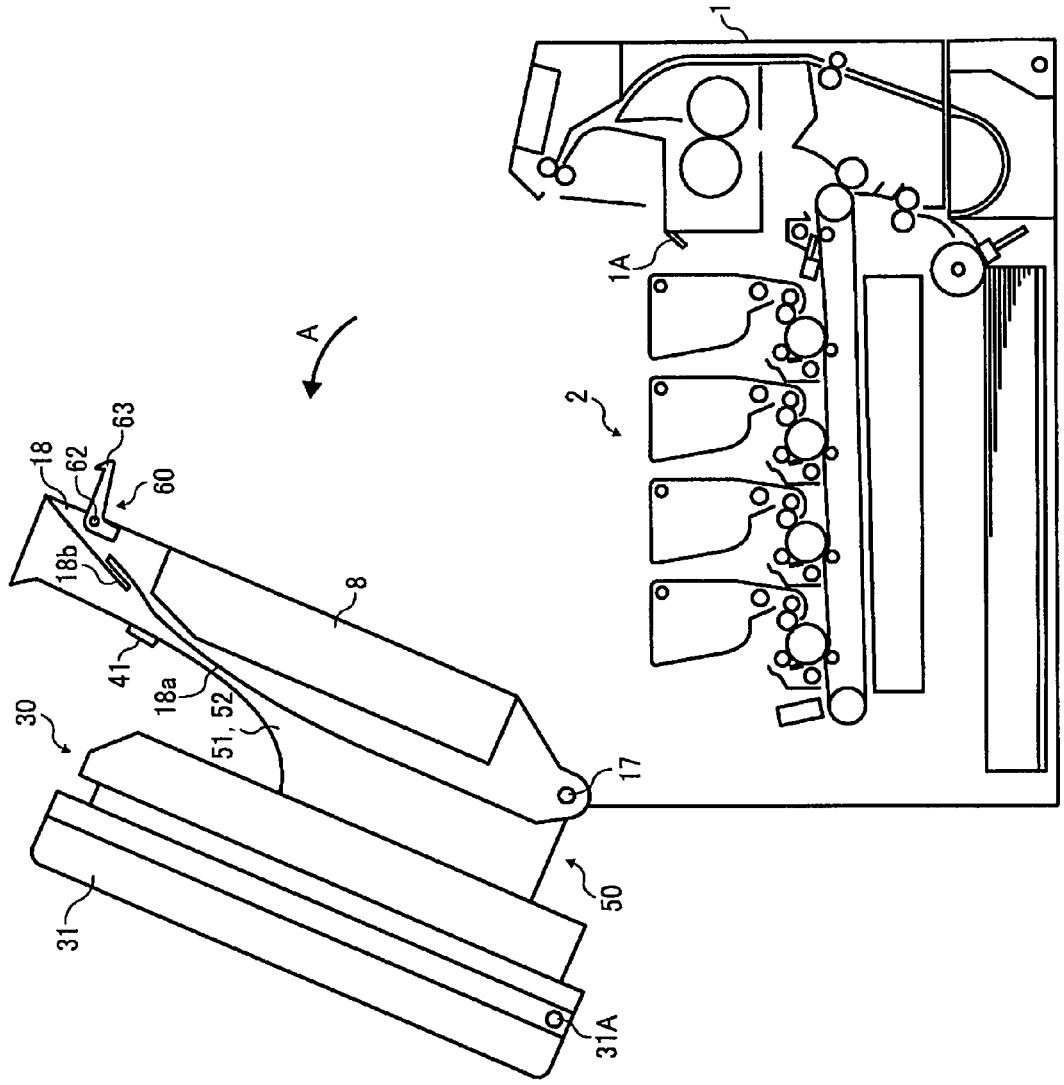
FIG. 3 is a vertical cross sectional view illustrating an exemplary condition of the image forming apparatus when an upper cover is open.

To the lower side surface of the upper cover member 18, an optical scanning device 8 as a part of the image formation device is attached. Specifically, as shown in FIG. 3, the upper cover member 18 is attached to a fulcrum 17 arranged at the rear side of the apparatus body 1 and is upwardly openable by a handle 18b in a direction as shown by an arrow A. A cover lock device 60 is arranged on the apparatus body 1 to lock the upper cover member 18 when it is closed on the apparatus body 1.

Figure 4:
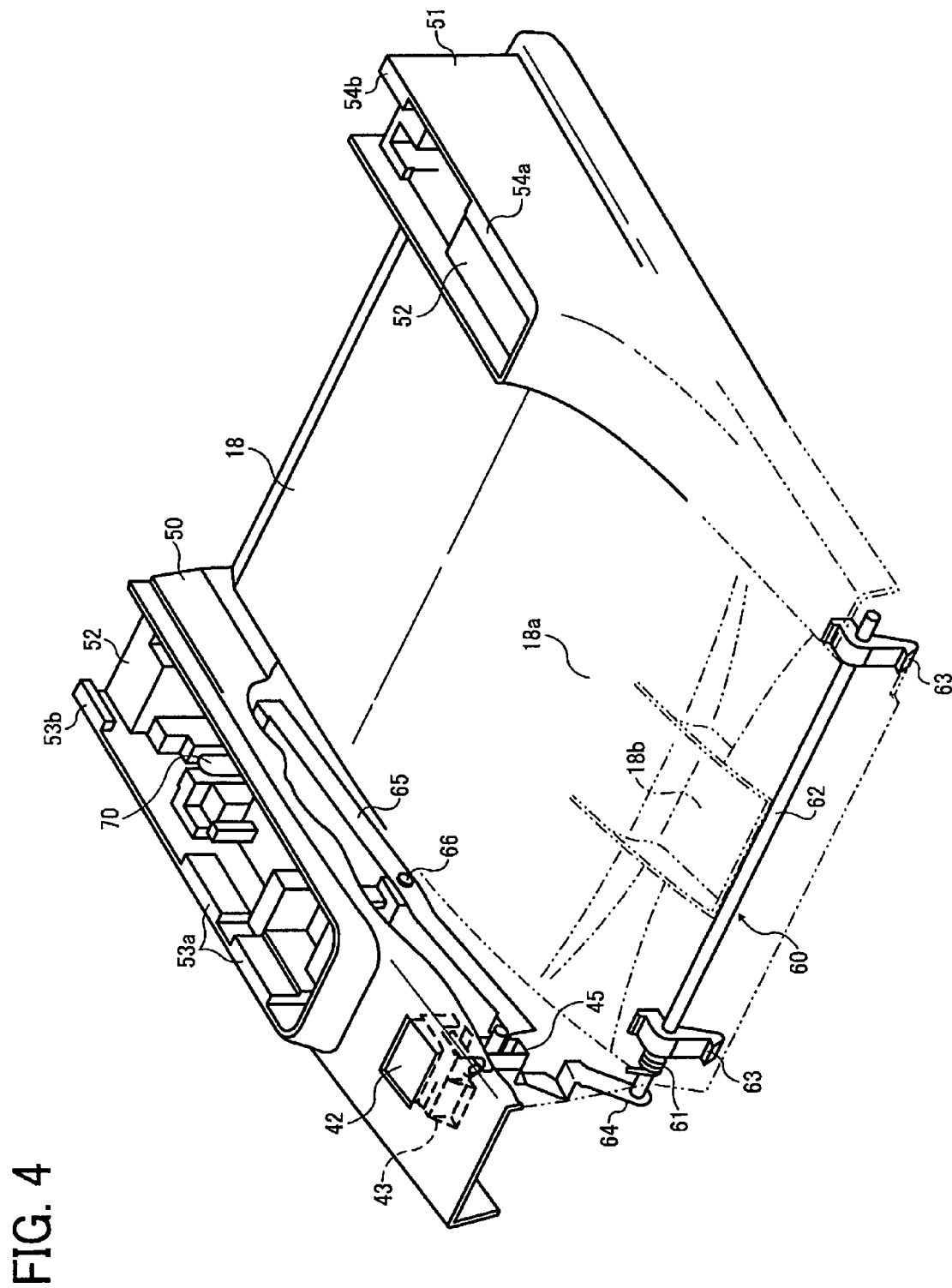
FIG. 4 is a perspective view illustrating an exemplary arrangement of a lock device for preventing the upper cover member from being open and an unlock device thereof.

As shown in FIGS. 2 to 4, the cover lock device 60 includes a supporting shaft 62 rotatably attached to the upper cover member 18 being horizontally extended, and plural lock claws 63 secured to both left and right sides of the supporting shaft 62. The cover lock device 60 locks the upper cover member 18 with the apparatus body 1 when the lock claw 63 engages with an engagement section 1A arranged on the apparatus body 1. A bias spring 61 is arranged on the cover lock device 60 so as to always provide a rotational force to the supporting shaft 62 in a prescribed direction so that the lock claw 63 is biased and engages with the engagement section 1A (see, FIG. 2} arranged on the apparatus body 1. When the upper cover member 18 is closed by the spring 61, the locking is automatically achieved.

Figure 5:
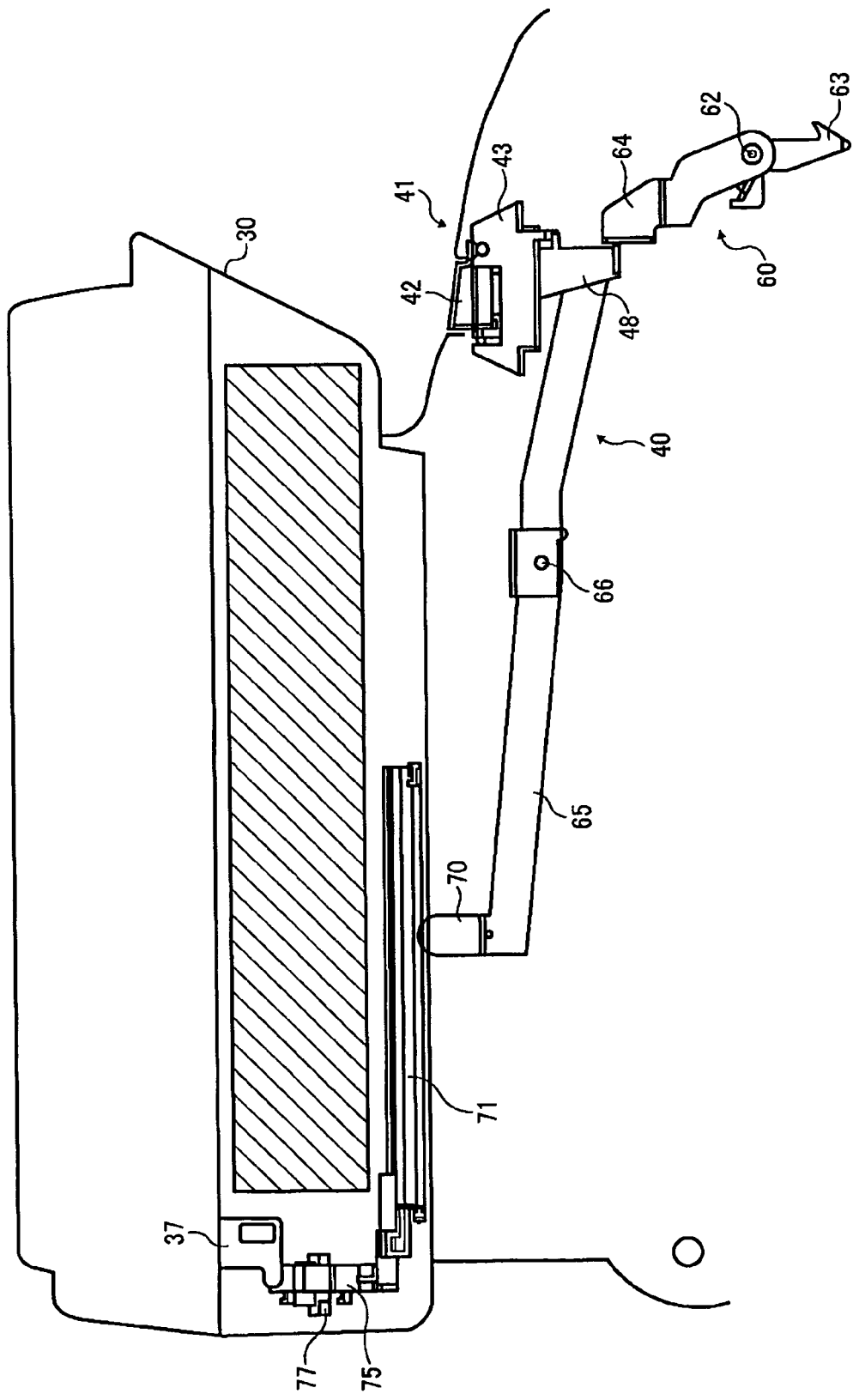
FIG. 5 is a side view illustrating an exemplary arrangement of the lock device for preventing the upper cover member from being open and the unlock device thereof.

The cover lock device 60 is unlocked by an unlock device 40 as shown in FIGS. 4 and 5. Specifically, as shown in FIG. 3, the upper cover member 18 is swung around the fulcrum 17 counterclockwise in FIG. 2 and is open. Since the upper cover member 18 is open at the front side of the image forming apparatus, accessing to respective units in the image formation section from the front side and replacement and maintenance thereof can becomes easier.

As shown in FIGS. 4 and 5, the unlock device 40 includes an operation section 41 having a depression button 42 for unlocking, and an unlock restriction device for restricting unlocking of the cover lock device 60. Initially, the operation section 41 is described in detail.

Figure 6:
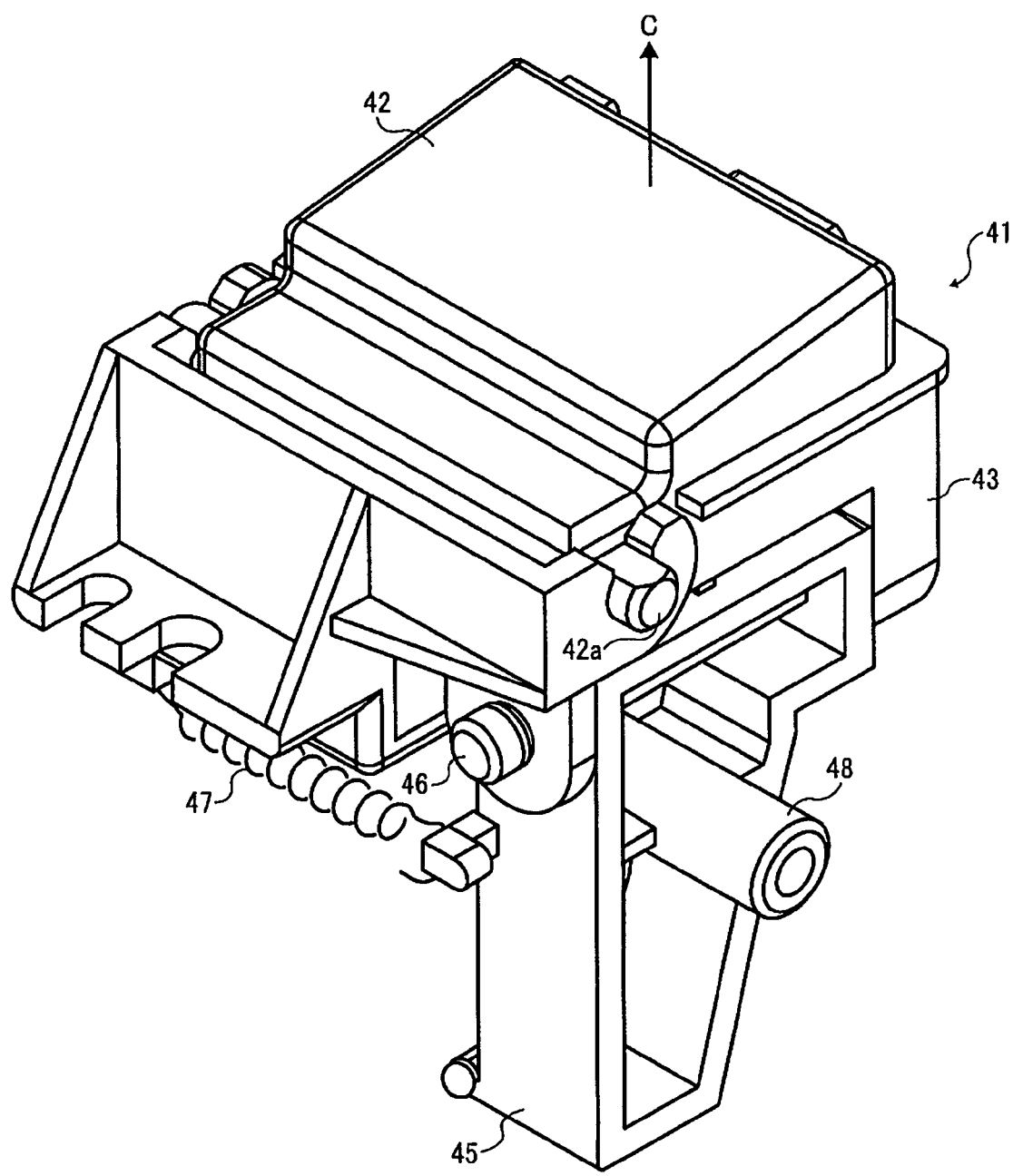
FIG. 6 is a perspective view illustrating an exemplary operation section included in the unlock device.
Figure 7:
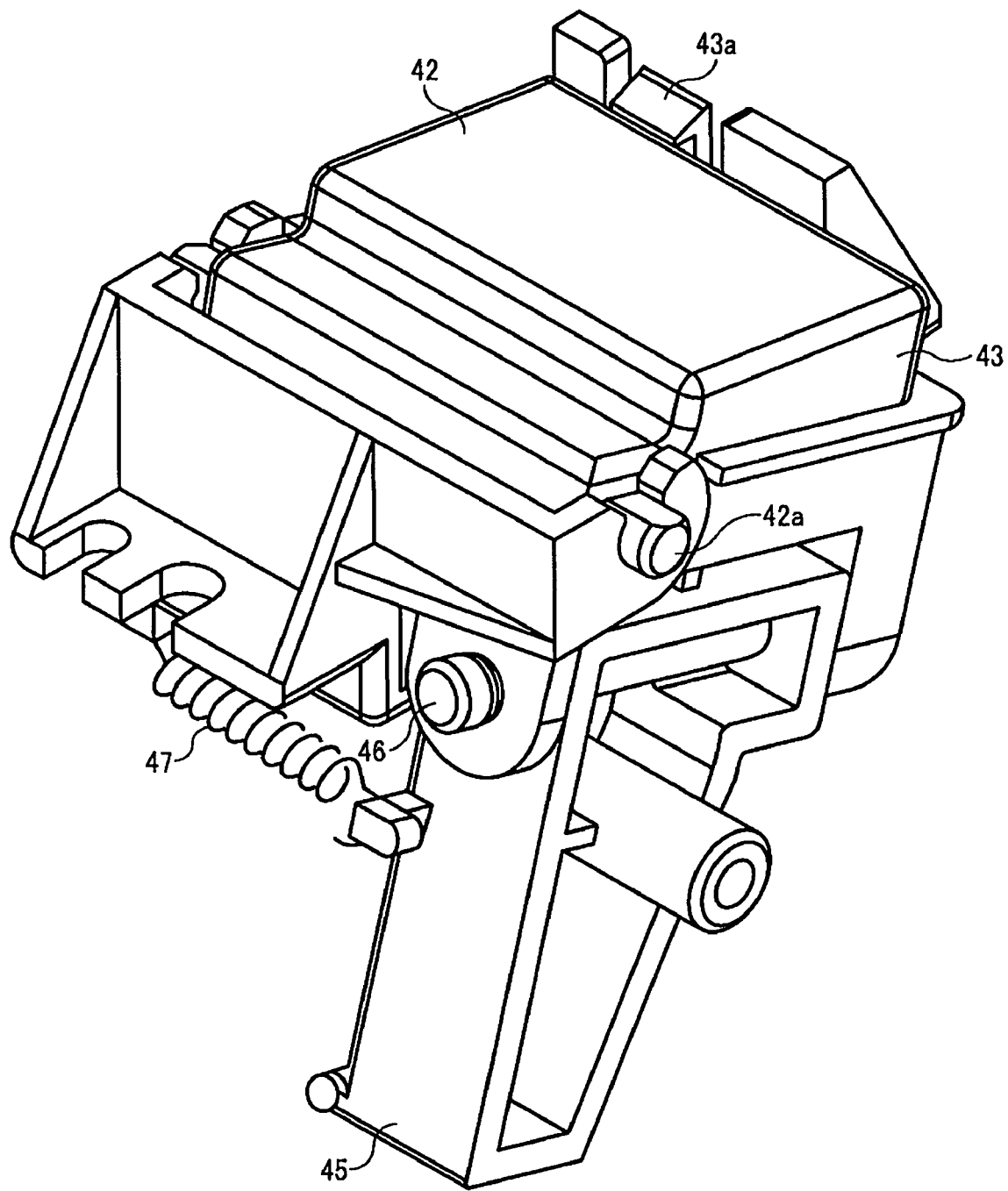
FIG. 7 is a perspective view illustrating an exemplary condition when a depression button arranged on the operation section of the unlock device is depressed.
Figure 8:
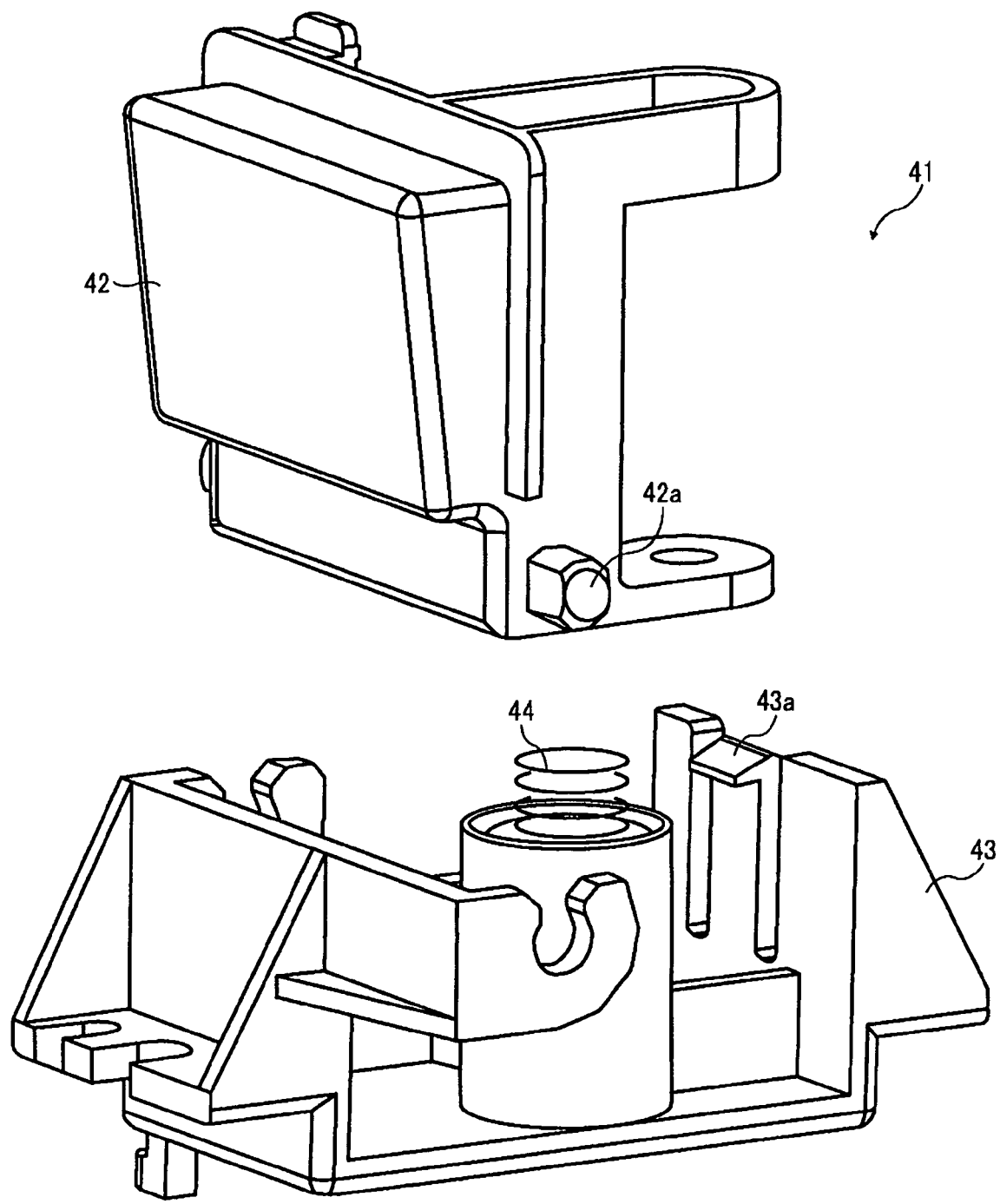
FIG. 8 is an exploded perspective view illustrating an exemplary operation section of the unlock device.

As shown in FIGS. 4 to 8, the depression button 42 is swingably attached to a holder at around a shaft 42a. The holder 43 is screwed, for example, and secured to the upper cover member 18. On the holder 43, a spring 44 (see FIG. 8) is arranged upwardly to bias and provided a rotational force to the depression button 42 around the shaft 42a in a direction as shown by an arrow c in FIG. 6. The depression button 42 thus biased by the spring in this way is held at a normal position as shown in FIG. 6 when a protrusion section 42b arranged on a side surface opposite to the shaft 42a contacts an engagement claw 43a arranged on the holder 43. When the depression button 42 is depressed, the button goes down (sinks) against the bias of the spring 44, and is swung to a slide down the lower surface of the depression button 42 partially contacts the holder 43 as shown in FIG. 7.

An oscillatable member 45 is attached to the depression button via a pin 46 so as to rotate the supporting shaft 62 via an relay lever 64 secured to the supporting shaft so that the lock claw 63 deviates from the engagement section 1A when the depression button 42 is depressed. The oscillatable member 45 oscillates between a non-unlock position where an operation of the depression button 42 via the pin 46 is not conveyed to the cover lock device 60 as shown by a rigid line, and an unlock position that where the operation thereof is conveyed to the cover lock device 60 to unlock thereof. When the pin 46 is viewed from right above, the axis of the pin 46 forms a prescribed angle, 90 degree centigrade in this example, with that of the shaft 42a serving as a rotational fulcrum of the depression button 42.

Figure 11:
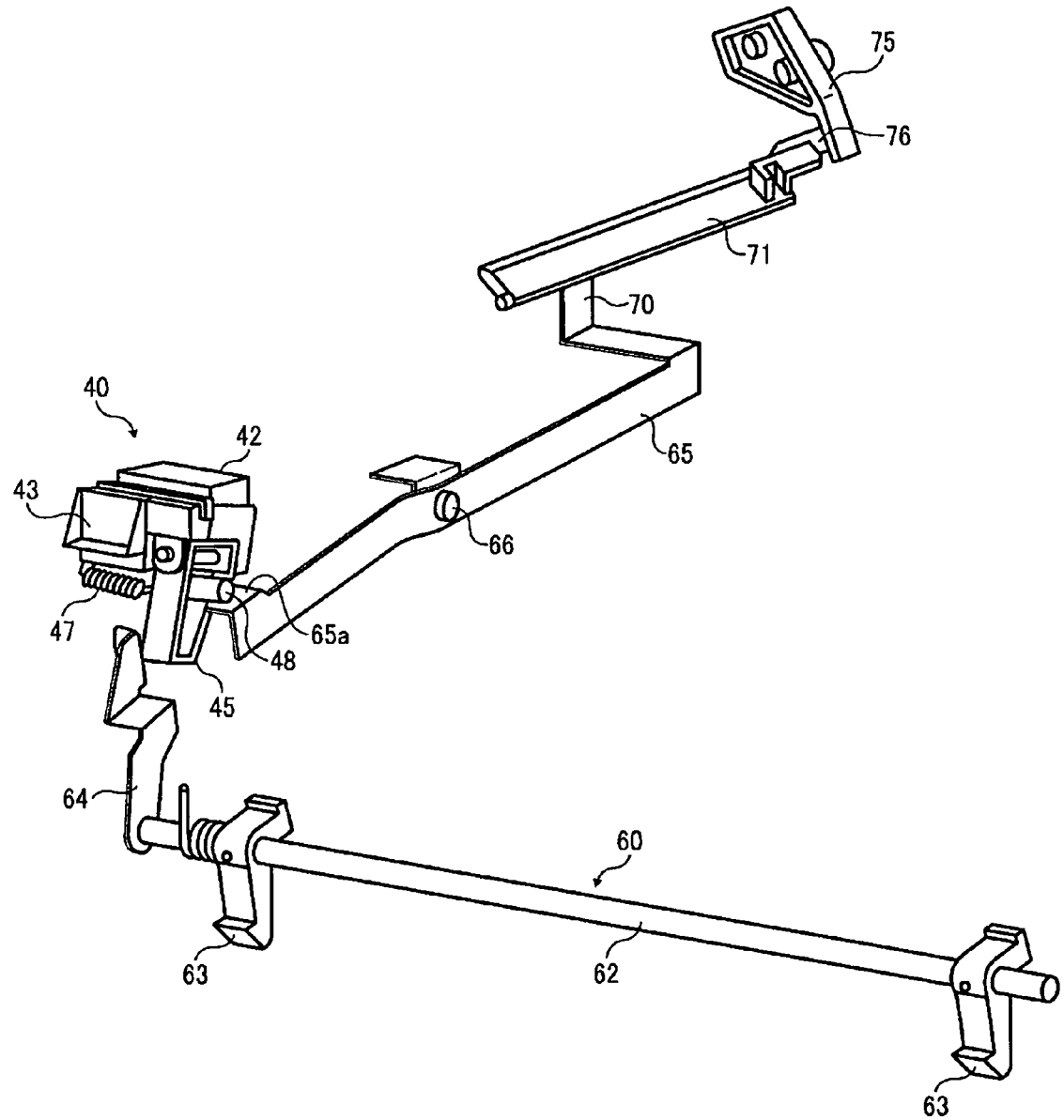
FIG. 11 is a perspective view illustrating an exemplary arrangement of the unlock device.
Figure 13:
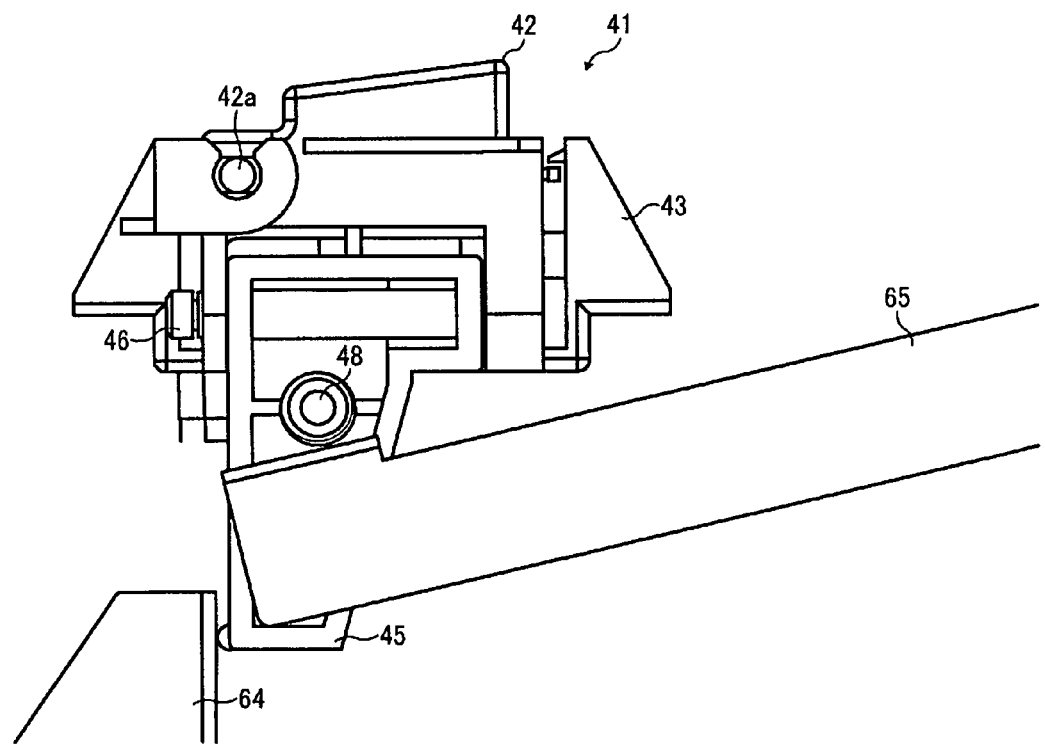
FIG. 13 is a chart illustrating exemplary unlock positions of the unlock device and the lock device.

A spring 47 is arranged on the oscillating member 45 to hold it at the unlock position, capable of unlocking the cover lock device 60 in response to an operation of the button 42. Specifically, as shown in FIGS. 11 and 13, the oscillating member 45 is located being slightly distanced from the relay lever 64 of the cover lock device 60 at the unlock position. Thus, when a user depresses the button 42 to open the upper cover member 18, the depression button 42 swings in a reverse direction to an arrow C around the shaft 42a as shown in FIG. 7. Then, the oscillating member 45 depresses the relay level 64 and rotates the supporting shaft 62 counterclockwise in FIG. 4 (clockwise in FIG. 5) against the bias of the spring 61 and thereby the lock claw 63 disengages with the engagement section 1A. At this moment, an appropriate pop up mechanism can be provided on the upper cover member 18 to slightly raise the upper cover member 18 just when the lock claw 63 disengages, so that the user can recognize unlocking.

The unlock restriction device rotates and displaces the oscillating member 45 arranged between the depression button and the cover lock device 60 to the non-unlock position around the pin 46, where the operation of the depression button 42 is not conveyed to the cover lock device 60, to prohibit the upper cover member 18 from being open, when the platen cover 31 of the image reading device 30 is open. Specifically, at that time, the depression button can be depressed by a length, but is ineffective. Specifically, almost no resistance is caused when button is depressed.

As shown in FIGS. 6 and 7, an operation pin 48 is planted on the right side surface of the oscillating member 45. As shown in FIG. 11, one end 65a of the lengthy lever 65 is swingably arranged to the upper cover member 18 via the shaft 66 almost extending from the front to rear sides of the sheet stacking section 18a and contacts the lower section of the operation pin 48. As shown in FIG. 5, a convex section 70 is formed on the other end of the length lever 65 and upwardly protrudes and contacts the lower surface 72 of the unlock member 71. The unlock member 71 has a prescribed thickness and is formed in a state of rectangles. The unlock member 71 is rotatably attached to the image reading device 30 around a rotational fulcrum 73 arranged on one side of a widthwise direction thereof. The image reading device 30 is slidable in a sheet ejection direction as mentioned later. The unlock member 71 is a length member longer than a sliding width of the image reading device 30 in a sliding direction. Thus, wherever the image reading device slides, a positional relation enabling the convex section 70 of the lengthy lever 65 to contact the unlock member 71 can be maintained. Further, the lengthy level 65 is generally held at a position where the operation pin 48 biased by the spring 47 contacts the one end 65a. The convex section 70 either almost contacts or is separated from the lower surface 72 of the unlock member 71. In this example, the convex section 70 is separated for the purpose of ease of explanation.

Figure 12A:
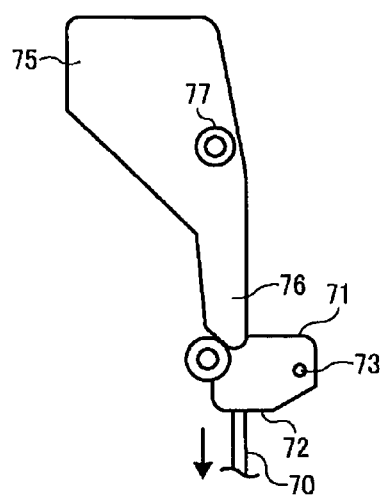
FIGS. 12A and 12B collectively illustrate an exemplary positional relation between the platen cover and the unlock device during an opening/closing operation.

Swinging of the unlock member 71 is restricted by a stopper, not shown, to a range between a lock position where the lower surface 72 of the unlock member 71 of FIG. 12a depresses the convex section 70 and an unlock position where the lower surface 72 is separated from the convex section 70. To the unlock member 71, a rotational force is applied by a spring, not shown, around the rotational fulcrum 73 toward the unlock position where the convex section 70 is separated from the lower surface 72.

Figure 12B:
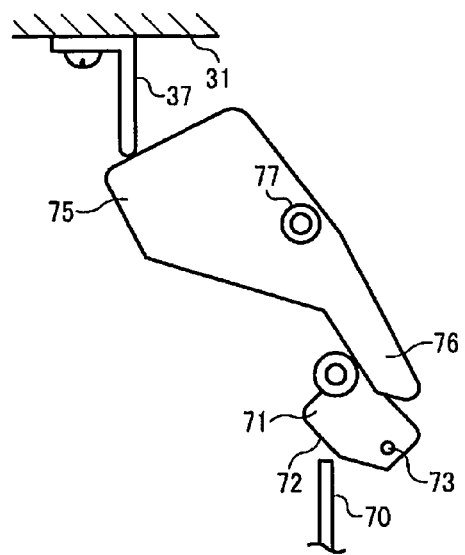

The unlock member 71 swings between the lock and unlock positions via a leg 76 of the operation member 75 operated by opening and closing movements of the platen cover 31 contacting the rear end of the unlock member 71. The operation member 75 is attached to the image reading device 30 (not shown in FIG. 10) and is rotatable around the fulcrum 77. When the platen cover is open as shown by a dotted line in FIG. 2, the operation member 75 is free, and is held at the lock position while the leg 76 thereof contacts the unlock member 71 by means of a spring, not shown, as shown in FIG. 12A. Specifically, the respective springs apply reverse rotational forces to the operation member 75 and the unlock member 71 to each other. However, since the spring biasing the operation member 75 exceeds that of the unlock member 71, the unlock member 71 is held at the lock position when the operation member 75 is free. Then, when the platen cover 31 is closed, the operation member swings counterclockwise around the fulcrum 77 as shown in FIG. 12B. As a result of this swinging, the leg 76 of the operation member 75 is moved in a direction to separate from the unlock member 71. The unlock member 71 swings clockwise around the rotational fulcrum 73 being biased by a spring force of the spring 74 and the lower surface 72 thereof separates from the convex section 70.

Figure 9:
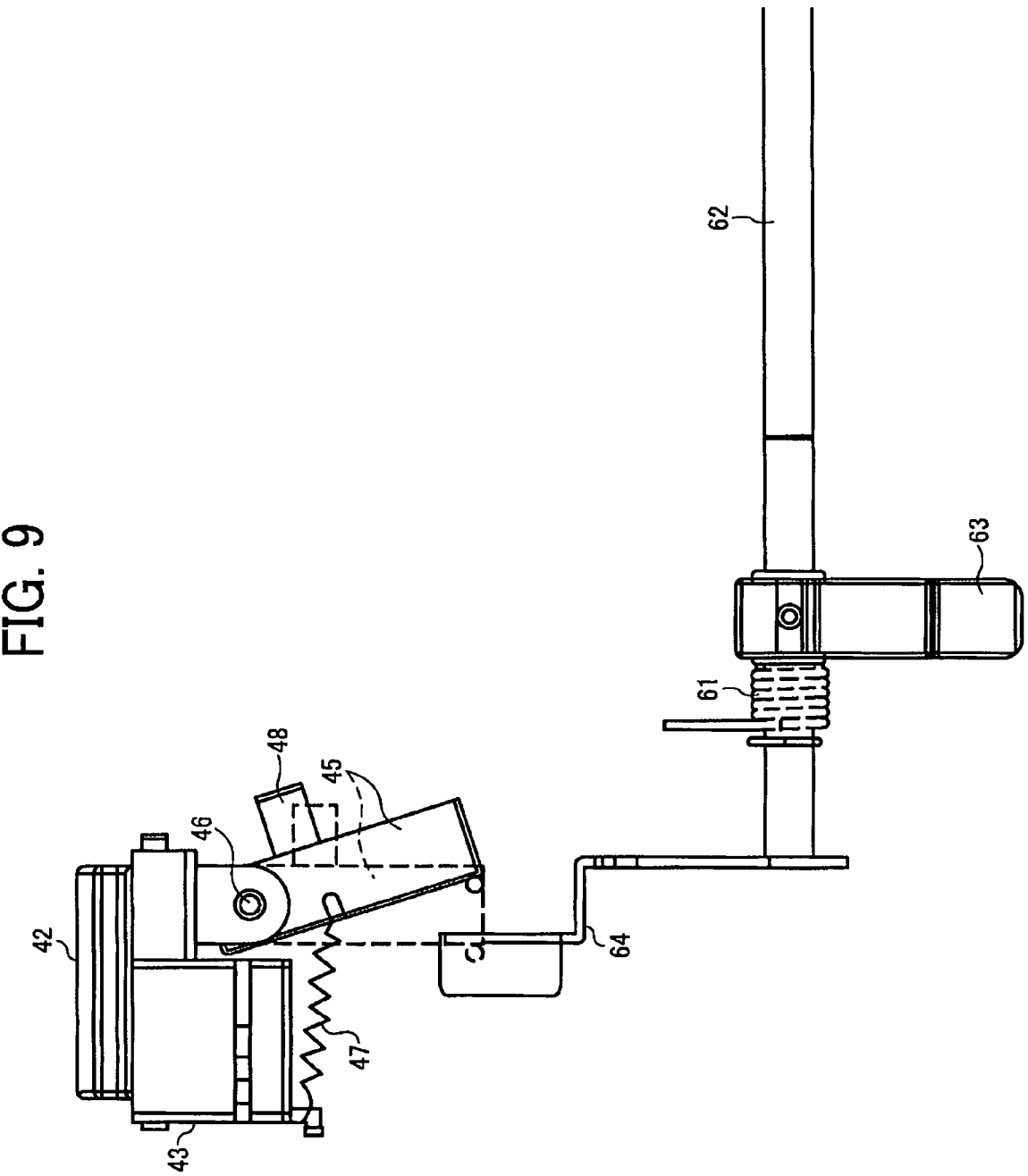
FIG. 9 is a chart illustrating an exemplary unlock and unlock restriction positions of the unlock device.
Figure 10:
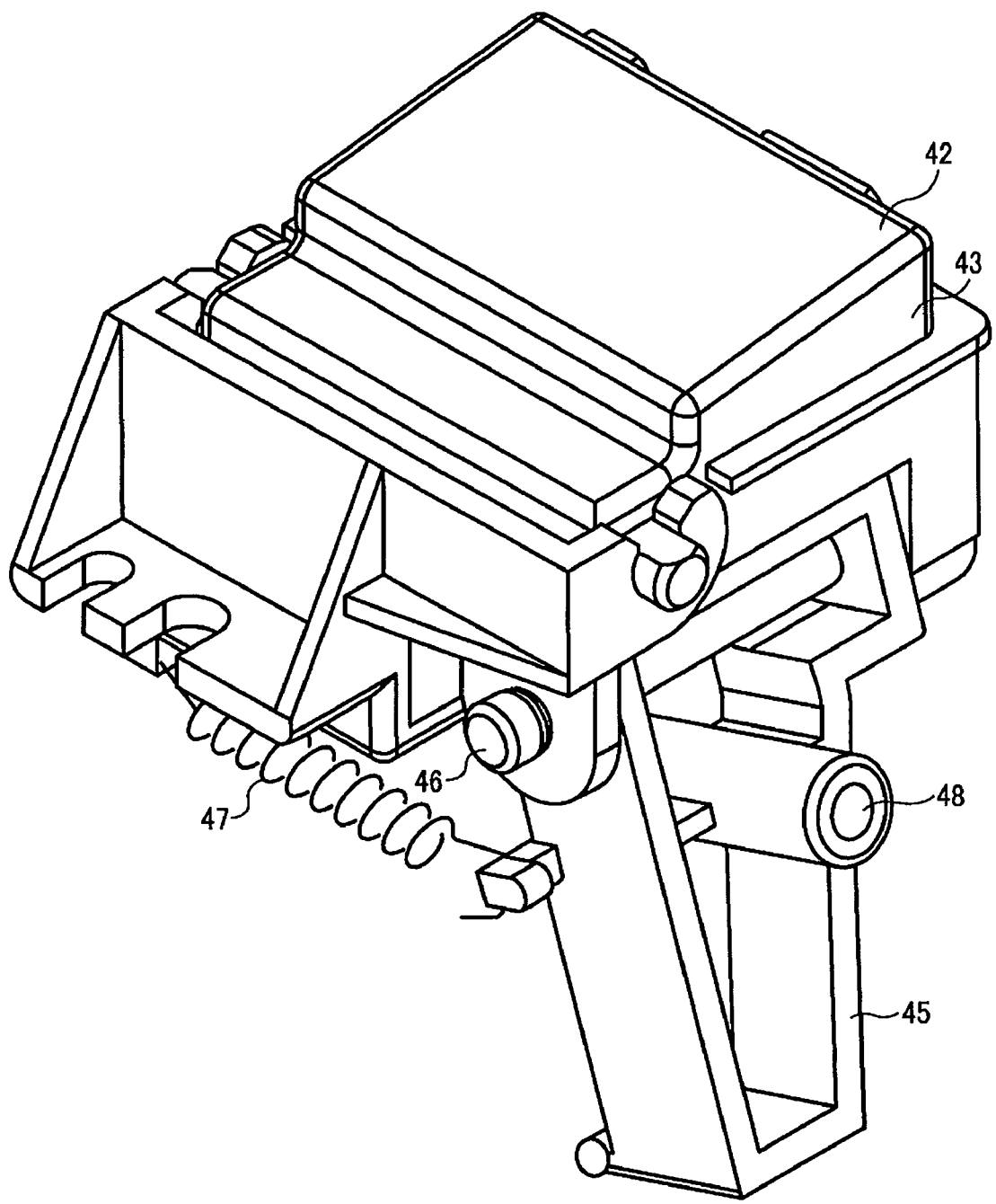
FIG. 10 is a perspective view illustrating an exemplary operation section of the unlock device.
Figure 14:
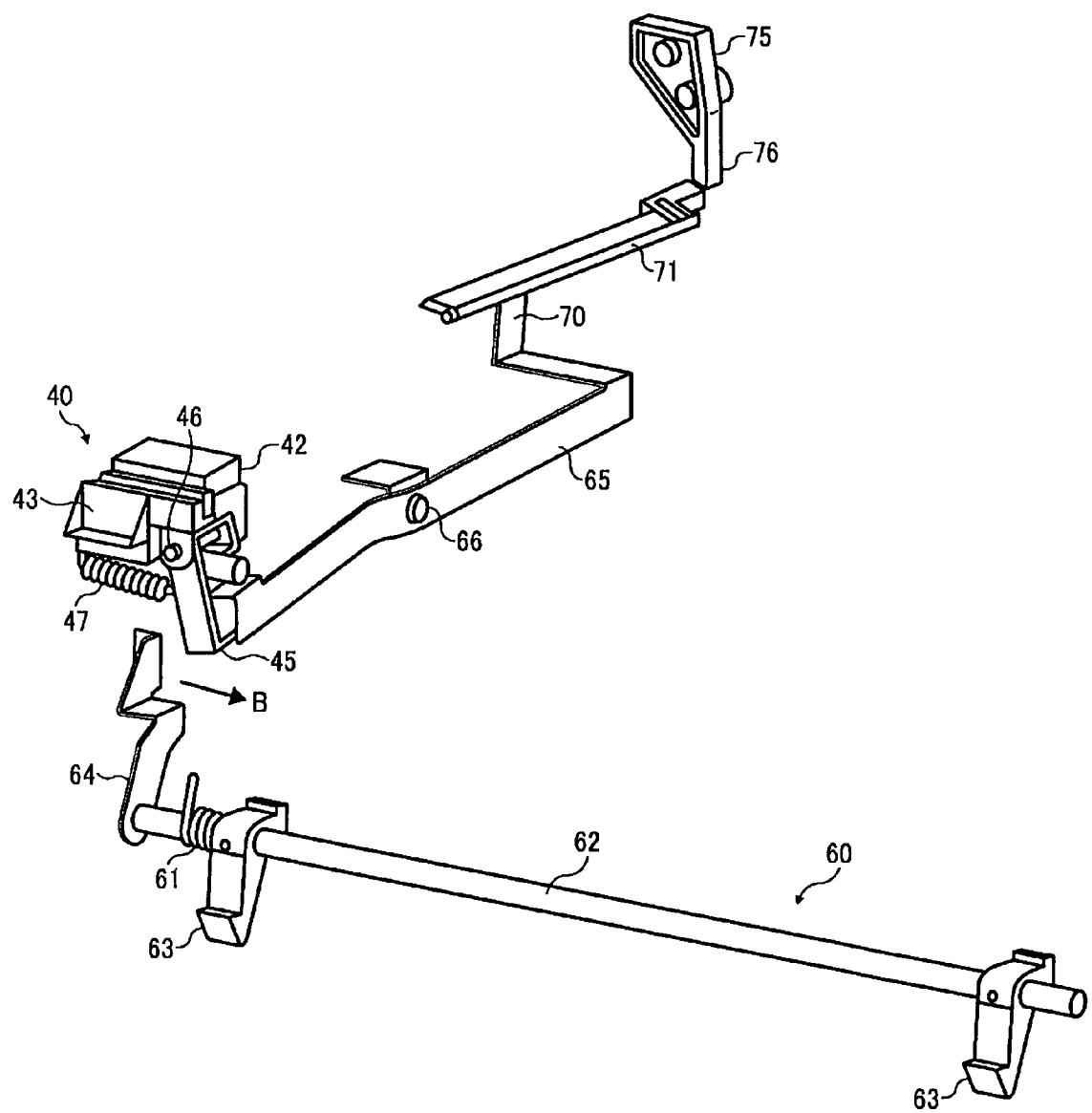
FIG. 14 is a chart illustrating an exemplary arrangement of the unlock device at an unlock restriction position.

In this way, when the platen cover 31 is open, the unlock member 71 pushes up the convex section 70 via the lower surface 72. The lengthy lever 65 then swings counterclockwise in FIG. 5 (clockwise in FIG. 11) around the shaft 66. Simultaneously, one end 65a of the lengthy lever 65 swings the oscillating member 45 around the pin 46 in a throw up direction to the non-unlock position via the operation pin 48 as shown in FIG. 10. As shown by a rigid line of FIGS. 9 and 14, the oscillating member 45 at the non-unlock position does not contact the relay lever 64 even when the depression button 42 is depressed. Thus, depression movement of the depression button is ineffective.

In this way, in the case of the non-unlock position, the depression button is not locked (not fixed) and can be depressed. However, the depression button scarcely receives a resistance at the time. As a result, a member does not need be materially strengthened expecting application of unreasonable force.

Figure 15:
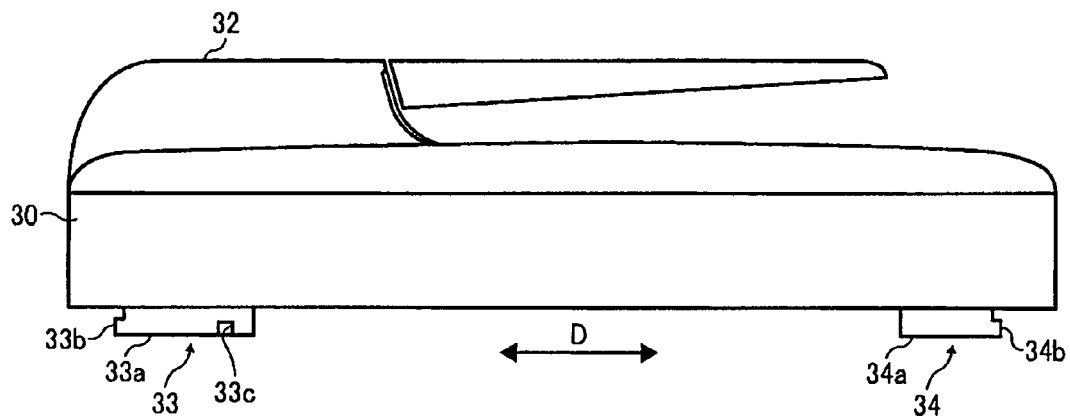
FIG. 15 is a chart illustrating an exemplary scanner when viewed from its front side.

Now, an exemplary sliding operation of the image-reading device is described with reference to FIGS. 15 and 16. In the widthwise direction of the image reading device 30, i.e., both left and right side in a direction D perpendicular to a slide direction B of a sheet ejection direction, plural rail sections 33 and are integrally formed as a slide contacting section. Respective of the rail sections 33 and 34 integrally formed with lower surfaces 33a and 34a as slide contacting surfaces and protrusion sections 33b and 34b. The rail section 33 includes a groove 33c extending in the sheet ejection direct (i.e., slide direction B of FIG. 2).

The image reading device 30 is slidably supported on the upper surfaces 52 (see FIG. 4) serving as slide contacted surfaces formed on the respective supporting sections 50 and 51 via the lower surfaces 33a and 34a of the respective rail sections 33 and 34, respectively. Rattling of the image reading device 30 created in a horizontal direction is suppressed by fitting two pins 55 protruding upward from the supporting section into the groove 33c formed in the rail section 33 of the image reading device 30 with a prescribed gap.

In the supporting sections 50 and 51, plural drop prevention sections 53 and 54 are integrally formed with the above-mentioned upper surfaces 52 at outsides thereof, respectively. By fitting the drop prevention sections 53 and 54 and into the protrusion sections 33b and 34b with a prescribed gap, drop out and rising upward of the image reading device 30 are suppressed. Otherwise, the drop out prevention sections can be formed at insides of the supporting sections 50 and 51, while the protruding sections are formed at insides of the rails 33 and 34 of the image reading device 30. Then, the drop out prevention sections of the supporting sections 50 and 51 fit into the protruding sections at the inside of the rails 33 and 34 with a prescribed gap, so that the same effect can be achieved.

Now, an exemplary function of the drop out prevention section according to several embodiments is briefly described. In these embodiments, the drop out prevention section arranged on the supporting section at least prevents the upper unit (e.g. an image reading device 30) from being extracted from the supporting section. Specifically, even when a user carries the image forming apparatus by hand gripping the upper unit, the upper unit is at least not dropped out or separated from the supporting section. Further, rising and deformation does not cause breakage, cut, and functional damage on parts and members included in the entire image forming apparatus. Specifically, the drop out prevention section assures the image forming apparatus of a prescribed intensity conventionally neglected in an image forming apparatus.

In this way, according to this embodiment, since the rails 33 and 34 are integrally formed with a casing of the image reading device 30, and the lower surfaces 33a and 34a of the rails 33 and 34 slide along the upper surface 52 of the respective supporting sections 50 and 51, a slide mechanism can be produced without additional parts at low cost.

Since the drop out prevention sections 53 and 54 are integral with the supporting sections 50 and 51 collectively forming the supporting section 50, respectively, additional parts are not needed for preventing the image reading device from being dropped out upward, thereby saving cost.

Further, the drop out prevention sections 53 and 54 can be intensified to receive load at both left and right sides of the supporting sections 50 and 51. Further, even when a force is applied to either a left or right side of the image reading device 30, upward rising can be prevented.

Otherwise, if the above-mentioned advantage or effect is not demanded by the same degree, drop out prevention sections 53 and 54 similar to those as mentioned above can be arranged on the side of the image reading device 30, while slide contacting sections having slide contacting surfaces similar to those in the rail sections 33 and 34 can be integrally formed on the supporting sections 50 and 51.

When the drop our prevention sections are arranged both on the inside and outside of the supporting section, a space for arranging the other parts disappears. Since the supporting section needs arrangement of parts such as an open close buffering mechanism for the upper cover, etc., the drop out prevention section preferably does not take a space as far as possible.

According to this embodiment, since the drop out prevention sections 53 and 54 are arranged in one of the outside and inside of the respective first and second supporting sections 50 and 51, the drop out prevention sections do not largely take a space obtaining prescribed rigidity.

Figure 16:
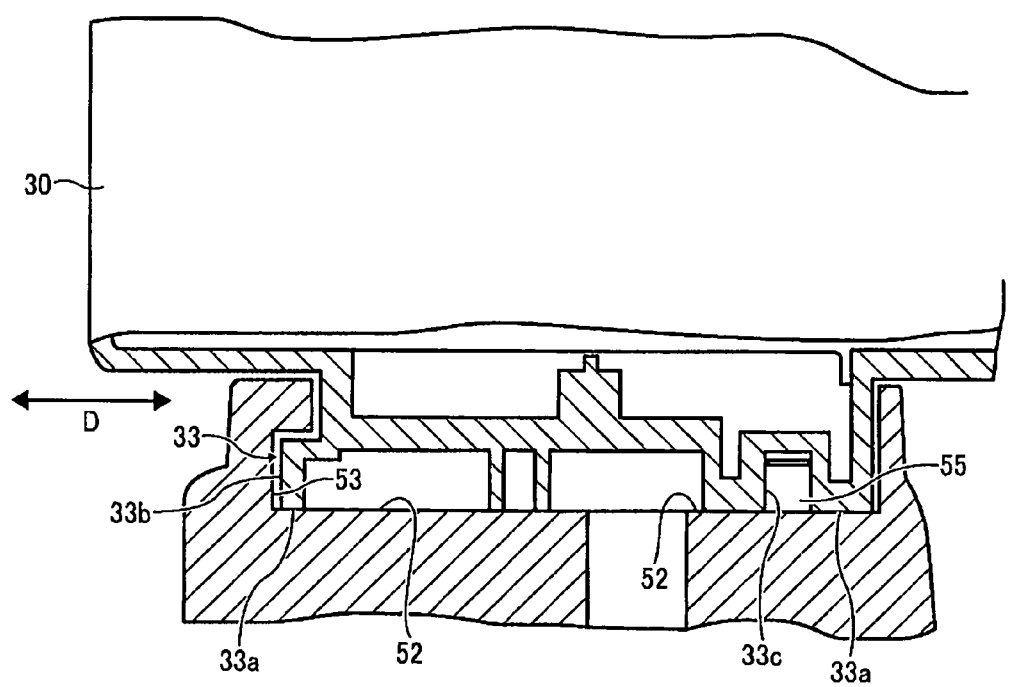
FIG. 16 is a cross sectional view mainly illustrating an exemplary condition when a rail section of the scanner slides and fits into the left side drop out prevention section.

As shown in FIGS. 4 and 16, the drop out prevention sections 53 and 54 are separated into the drop out prevention sections 53a and 54a arranged in the front side of the supporting sections 50 and 51, and into the drop out prevention sections 53b and 54b arranged in the rear side thereof. Thus, when a force is applied to the front side of the image reading device 30, the drop out prevention sections 53a and 54a receives the force. Whereas when a force is applied to the rear side of the image reading device 30, the drop out prevention sections 53b and 54b receives the force. As a result, the rising of the image reading device 30 can be accurately suppressed. Further, the other parts can be arranged in a space created between the drop out prevention sections separately arranged.

In this embodiment, the drop out prevention sections are separated and arranged both in the front and rear sides of the supporting sections for the reason of a limited space or a mold configuration. However, the drop out prevention sections 53 and can be arranged over the entire region of the supporting section. The drop out prevention sections 53 and 54 can be formed like a box to increase intensity while further reinforcing with ribs or the like. Thus, intensity of the dropout prevention sections 53 and 54 can be increased, so that when a user applies an upward force to the image-reading device 30, the drop out prevention sections 53 and 54 are not damaged or deformed at all.

As mentioned above, the image reading device 30 can slide in a direction as shown by the arrow B in FIG. 2. Specifically, FIG. 17A illustrates an initial condition in which the image-reading device 30 does not slide in the support sections 50 and 51. FIG. 17B illustrates a condition where the image-reading device 30 slides in the support sections 50 and 51 by the maximum stroke amount. When the image-reading device 30 is slidable, the image-reading device 30 needs be locked at plural positions not to move during usage. Thus, a lock mechanism is provided to the image reading device 30.

A lock mechanism for the image reading device 30 is arranged on the side of the supporting section 50 that slidably supports the image reading device 30. An operation button 80 for unlocking the lock mechanism is also arranged on the side surface as shown in FIG. 1.

Figure 18:
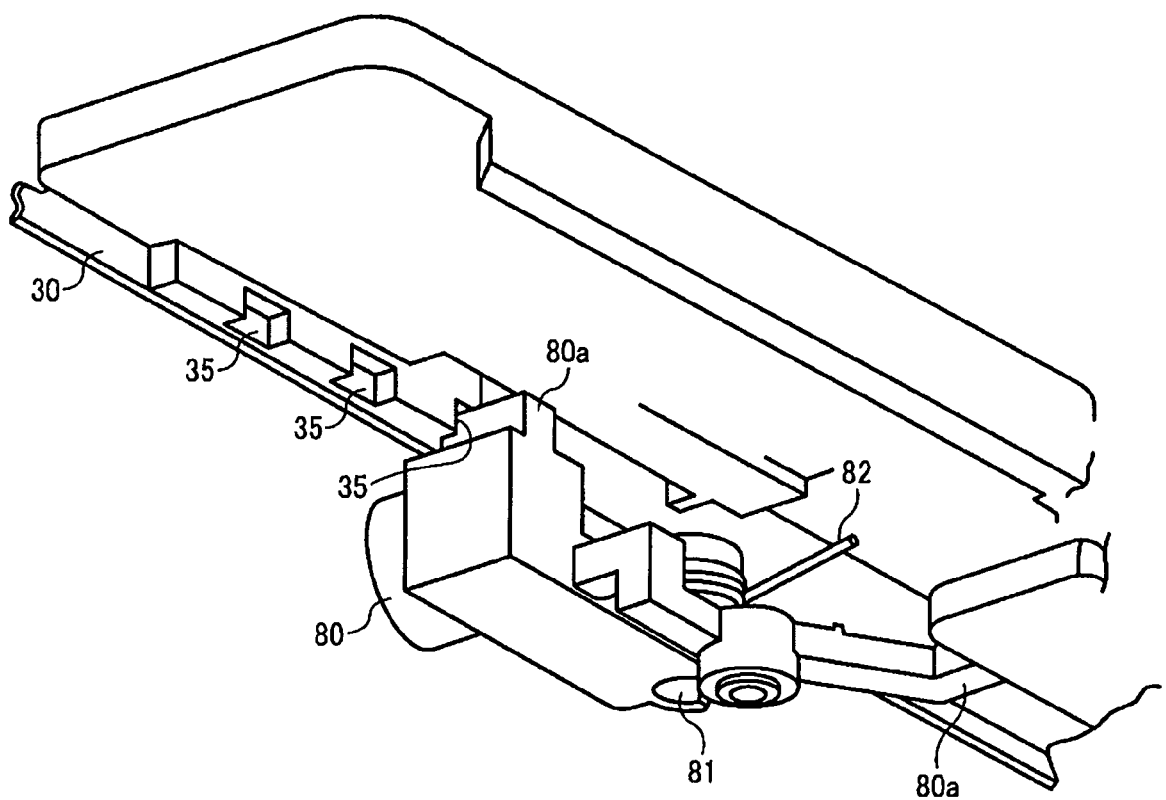
FIG. 18 is a schematic view illustrating a principal part of a slide lock.
Figure 19:
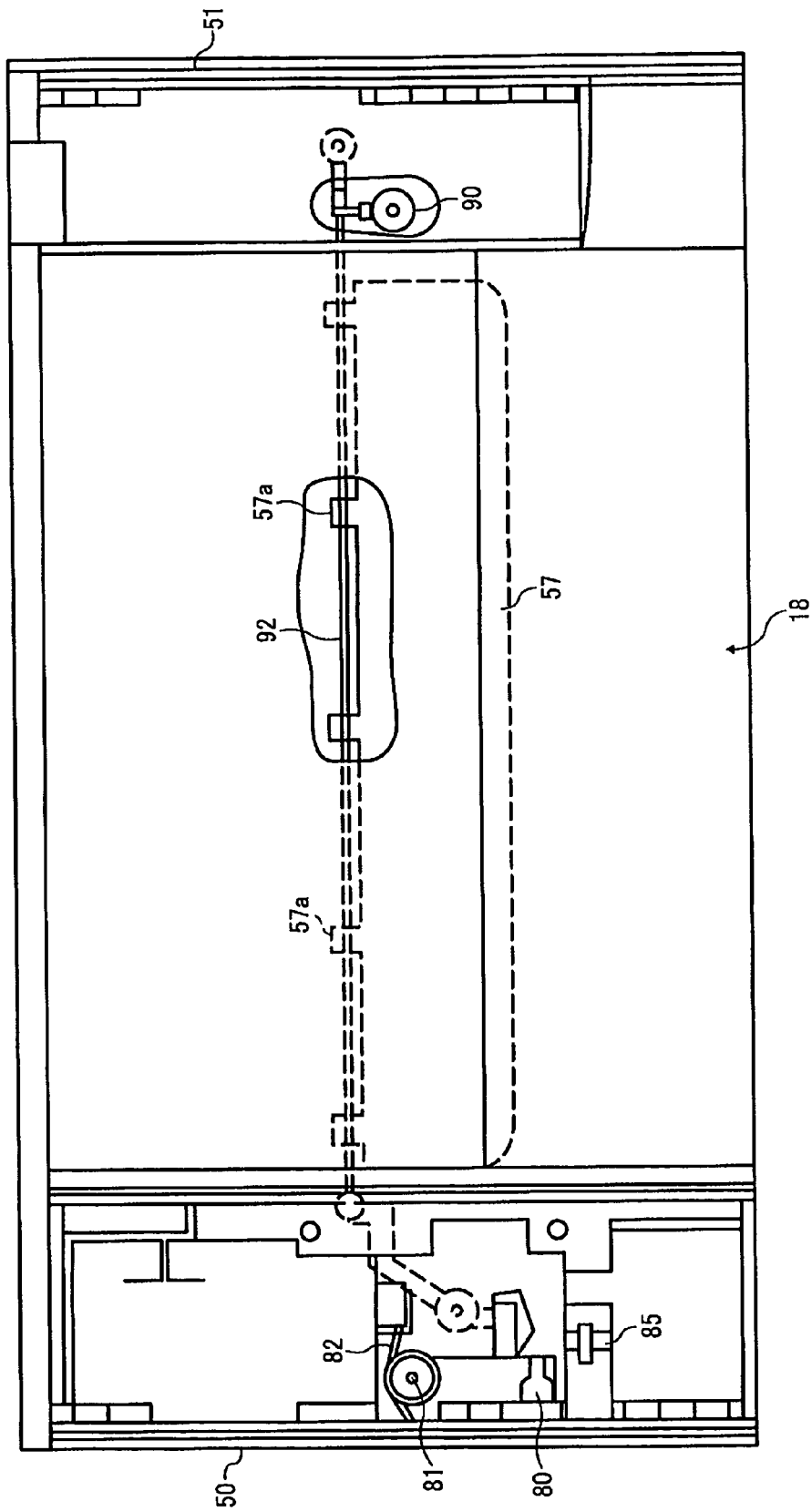
FIG. 19 is a plan view illustrating exemplary left and right supporting sections partially depicting a lock linking mechanism provided therein.

As shown in FIGS. 18 and 19, a torsion coil spring 82 is attached to a shaft section 81 of the operation button 80 and biases the operation button 80 to the outside of the apparatus. A hook shape portion 80a is integrally formed with the operation button 80 and engages with a cut away section 35 formed on the image reading device 30 and prevents the image reading device from sliding (i.e., locks) when biased by the torsion coil spring 82. As shown in FIG. 1, when the operation button 80 exposed to the side surface of the supporting section 50 is depressed against the bias of the torsion coil spring 82, the engagement is released and the image reading device becomes able to slide. Plural (e.g. three) cut away sections 35 are provided on the image reading device 30, and the image reading device 30 can be temporarily secured (i.e., locked) at the plural sections.

Figure 20:
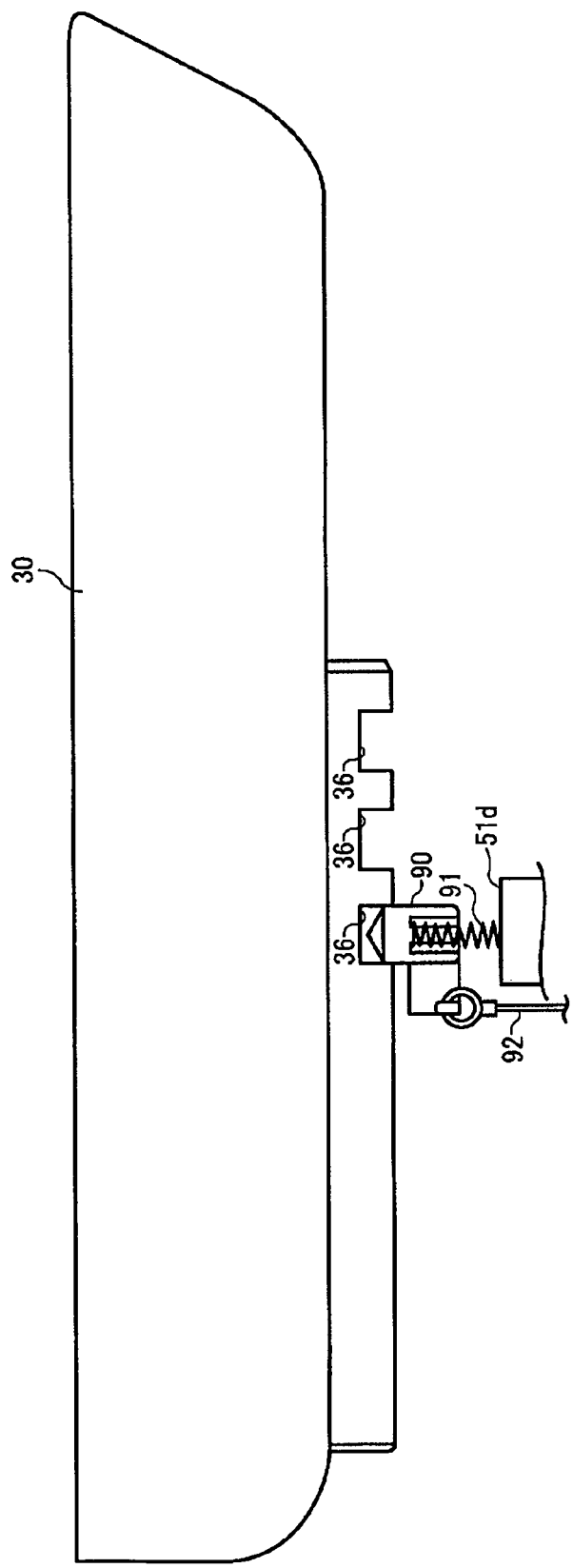
FIG. 20 is a cross sectional view illustrating a principal part of an exemplary slide lock provided in the other supporting section.

In this embodiment, by also providing one more slide lock mechanism on the right side supporting section 51, rattling of the image reading device 30 in the horizontal direction is decreased at the time of temporal locking. On the right side supporting section 51, as shown in FIG. 20, a cylindrical lock member 90 having a corn shape head is always biased upward by a compression spring 91 and engages with a groove 36 formed on the image-reading device 30. One end (upper end) of the compression spring 91 is engaged with a spring engagement section of the lower end section of the lock member 90. The other end (lower end) is engaged with a spring engagement section 51d integrally formed with the supporting section 51. The operation button 80 of the left side supporting section 50 and the cylindrical lock member 90 are linked together using a flexible wire 92 as shown in FIG. 19. The right side end the side of the supporting section 51) of the wire 92 of FIG. 19 is bent by 90 degree from the rear side to front side in FIG. 19 (i.e., from the front to rear side of the sheet in FIG. 20). The wire 92 then extends upwardly from the bottom and is linked with a hook engagement section in the drawing. Accordingly, by depression of the operation button 80, two lock mechanisms can be operated linking with each other. Further, as shown in FIG. 19, the wire 92 is guided without relaxing by a groove, not shown, arranged on the rear side rib formed on the upper cover member 18 in the sheet stacking section 40 and a guide 57a included in the wire depressing member 57 attached to the rear side of the upper cover member 18. By using the wire 92 for linking the left and right locking, lock mechanisms can readily be linked using a few parts even through a complex path.

When the operation button 80 is depressed against the biases of the torsion coil and compression springs 82 and 91, the wire 92 pulls and lowers the lock member 90. As a result, the lock member 90 is disengaged with the groove 36 of the image-reading device 30. At this moment, since the lock member 90 does not completely drop out from the groove 36, the corn shaped head is still hooked by the groove 36 as shown in FIG. 21B. In this state, when image reading device 30 is slid, since the groove further pushes down the lock member 90, the user can feel click touch. Further, since the user can also feel click touch when the lock member 90 is pushed down and engages with the lock member 90, the use can recognize a lock position sensuously.

However, when the platen cover 31 is open in the plural locations, the lock mechanism needs to move to the respective locations as the lock mechanism for continuously preventing the upper cover member 18 from being open. Then, the members from the depression button 41 to the lengthy lever 65 of a lock mechanism are arranged on the side of the upper cover member 18, while the members from the unlock member 71 to the platen cover 31 are arranged on the side of the image reading device 30.

When the platen cover 31 is open even a little and the upper cover member 18 is then open in the image forming apparatus including the thus configured lock mechanism, the platen cover is prevented from being swung in the same direction along with the opening of the upper cover member 18 regardless of the slide stopping positions of the image-reading device 30.

To further increase such an effect, a platen lock device 100 capable of preventing a platen cover 31 from being improperly open even when the upper cover member 18 is open is preferably employed. One example of such a platen lock device 100 is herein below described.

Figure 22:
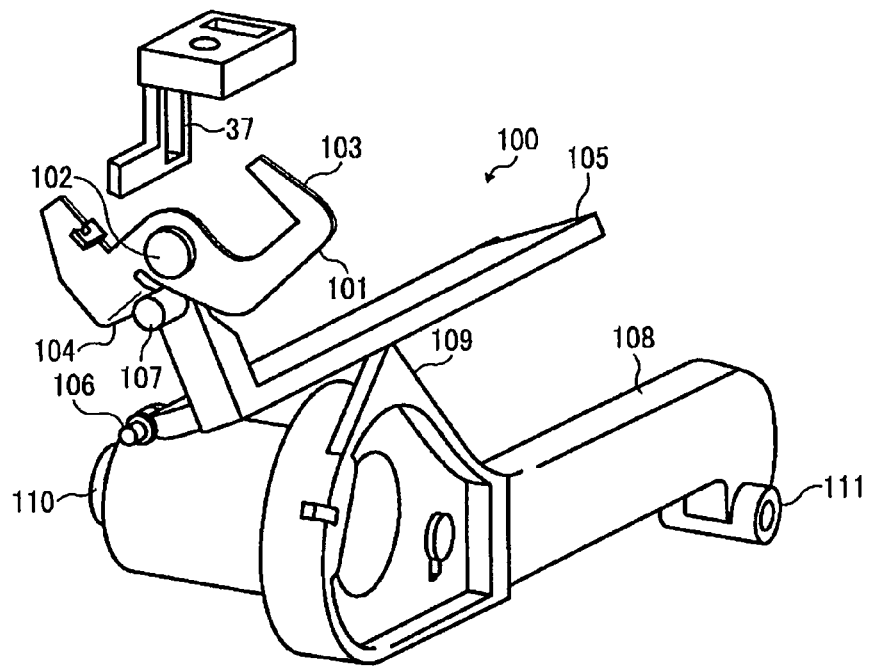
FIG. 22 is a perspective view illustrating the lock device when the image reading device is unlocked.
Figure 23:
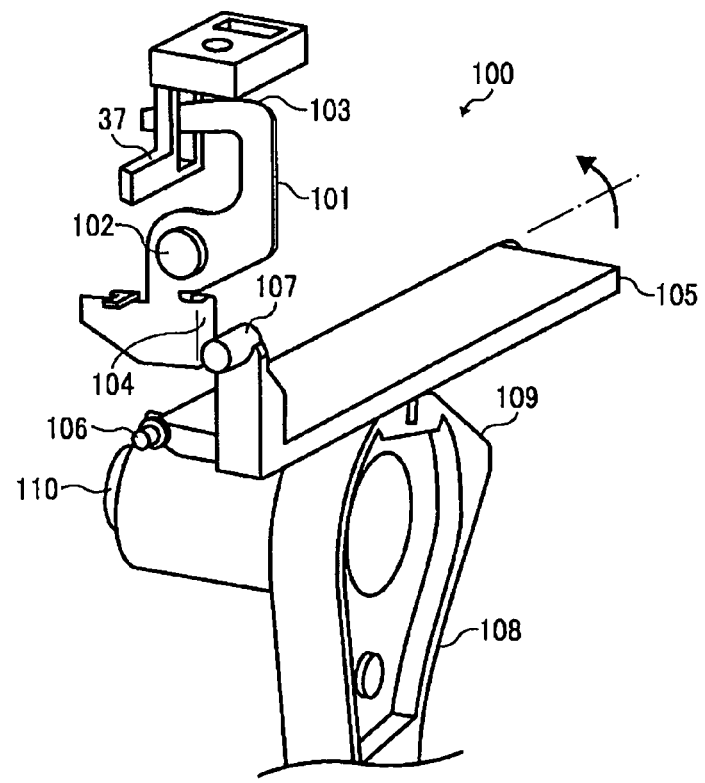
FIG. 23 is a perspective view illustrating the lock device when the image reading device is locked.

As shown in FIGS. 22 and 23, the platen lock device 100 includes a lock member 101 engaging with an engagement section 37 arranged on the platen cover 31 and a lock intermediate member 105 contacting the lock member 101 at an operation section 107 for
moving the lock member 101.

The lock member 101 is rotatably supported by the image reading device 30 around a rotational fulcrum 102. The lock member 101 includes a lock claw 103 engageable with the engagement section 37 at its upper side end. The lock member 101 also includes an operation piece 104 at its one side end opposite to the lock claw 103 about the rotational fulcrum 102.

The lock intermediate member 105 has a rectangular plate and is rotatably supported by the image reading device via the supporting shaft 106 attached to its one side in a lengthwise direction. The lock intermediate member 105 includes an operation pin 107 at its other side extending in the longitudinal direction contacting the operation piece 104 of the lock member 101. The lock member 101 is biased by a spring, not shown, to cause the operation piece 104 to rotate around the rotational fulcrum 102 and contact the operation pin 107. Thus, the operation piece 104 always contacts the operation pin 107.

Figure 24:
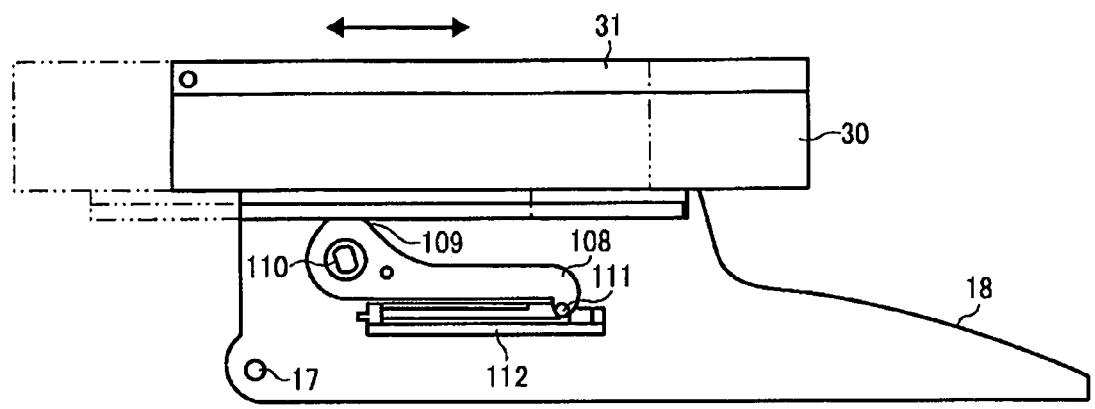
FIG. 24 is a schematic vertical cross sectional view illustrating an exemplary operation member included in the lock device when the upper cover is closed.

The lock intermediate member 105 swings around the supporting shaft 106, and its leading end side is seated on the cam shape portion 109 by a bias of the above-mentioned spring. As shown in FIG. 24, one end of the operation member 108 is rotatably attached to the apparatus body 1 via the shaft 110, the other end being movable along the rail 112 of the apparatus body 1. The cam shape portion 109 has substantially the same core center as the shaft 110.

When the upper cover member 18 is closed as an ordinary condition, the protrusion section of the cam shape portion 109 as shown in of FIG. 22 contacts the lock intermediate member 105. At this moment, the lock intermediate member 105 obliquely inclines upward about the supporting shaft 106, while the lock claw 103 of the lock member 101 is disengaged with the engagement section 37. Accordingly, the platen cover can freely be open.

Figure 21:
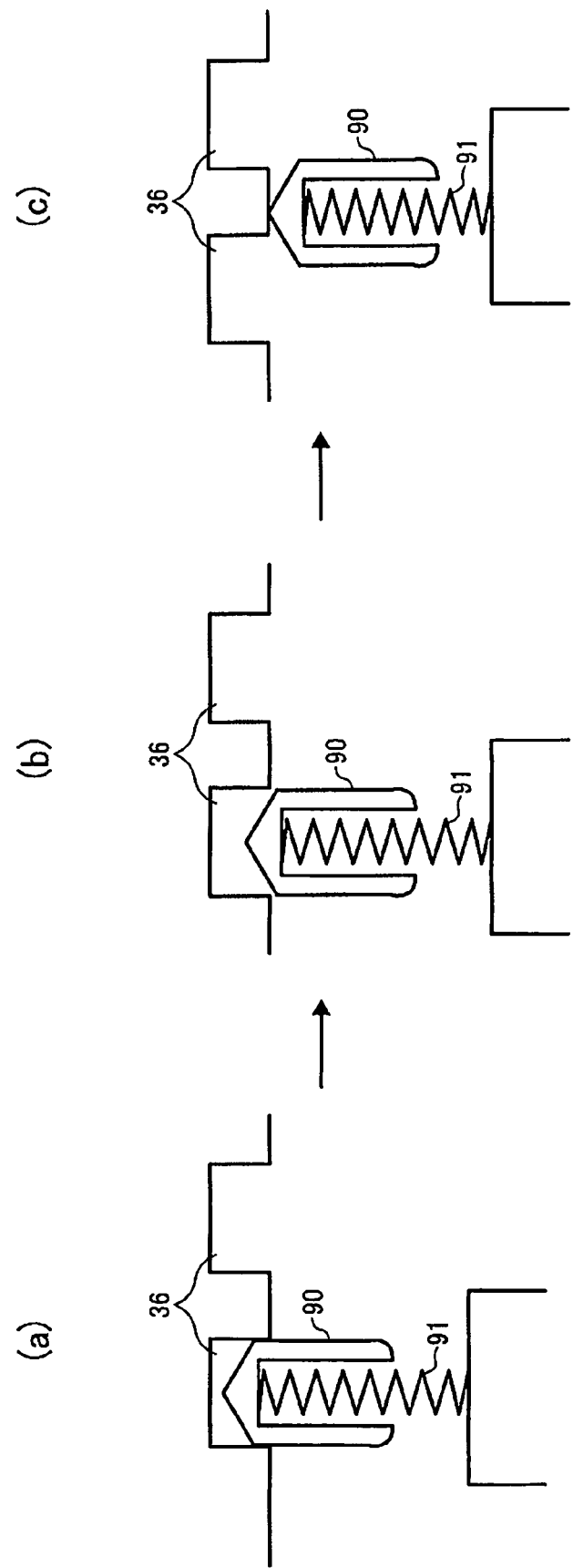
FIGS. 21A to 21C collectively illustrate exemplary transition of engagement of the lock member with grooves.
Figure 25:
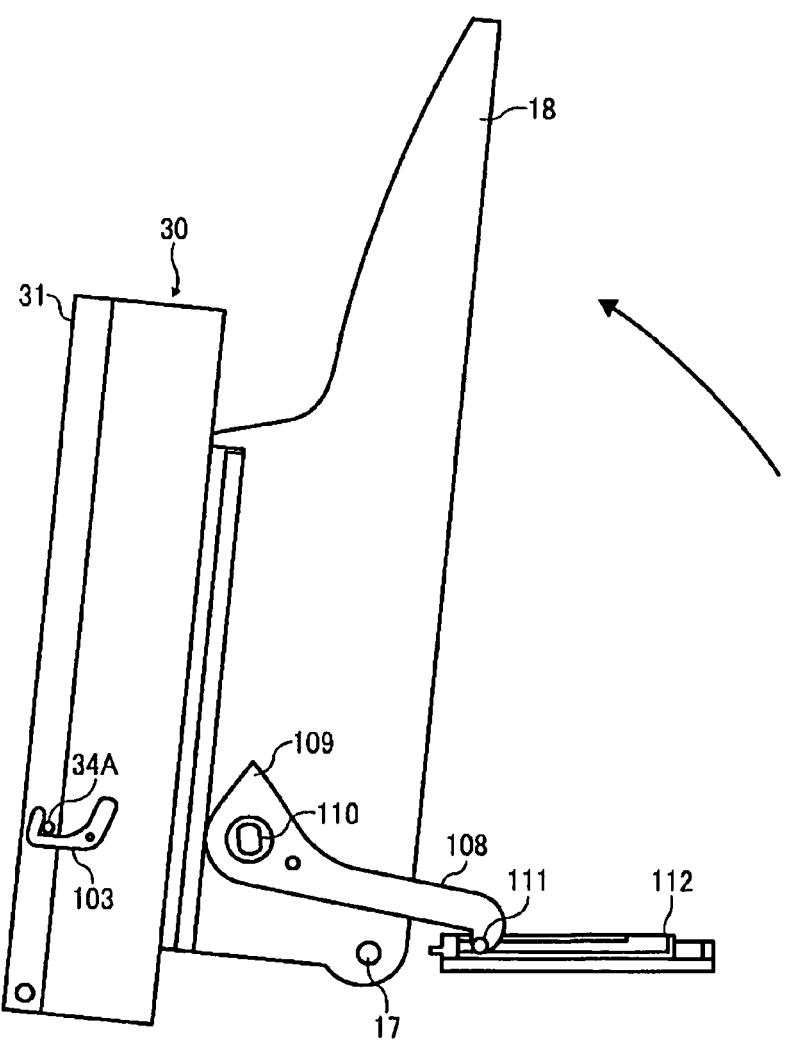
FIG. 25 is a schematic vertical cross sectional view illustrating the operation member of the lock device when the upper cover is open.

When the upper cover member 18 is upwardly open around the shaft 17 to replace a process cartridge or the like, the other end of the operation member 108 moves along the rail 112 arranged on the upper surface of the apparatus body 1 and below the region between the first and second supporting sections 50 and 51, and whereby the operation member 108 rises as shown in FIG. 25. At this moment, the operation member 108 swings clockwise in FIG. 23 around the shaft 110, and a protrusion section of the cam shape portion 109 separates from the lock intermediate member 105 and a circular section thereof makes contact. Then, the lock intermediate member 105 swings clockwise around the supporting shaft 106. Simultaneously, the lock member 101 is swung counterclockwise around the rotational fulcrum 102 and the lock claw 103 engages with the engagement section 37, whereby the platen cover 31 becomes the locked condition as shown in FIG. 21.

Thus, when the upper cover member 18 is open, the platen cover 31 of the image-reading device 30 is locked linking with such an opening operation. Accordingly, even when both of the upper cover member 18 and the platen cover 31 of the image reading device 30 are open around the rear side rotational fulcrum from the front side of the apparatus, the platen cover 31 is prevented from being open. Accordingly, a problem, such as damage, etc., of the upper cover member 18 caused by careless opening of the platen cover 31 can be resolved.

Further, the platen lock device 100 is also enabled to lock the platen cover 31 all over the sliding contact position of the image-reading device 30. Specifically, a width of the lengthwise direction of the lock intermediate member 105 is longer than a sliding contact width of the image reading device 30. In addition, the operation member 108 is arranged at a prescribed position not deviated from the lock intermediate member 105. Accordingly, since the lock intermediate member 105 always contacts the cam shape portion 109 of the operation member 108, the platen lock device 100 can lock the platen cover 31 regardless of the position of the image-reading device.

When the lock intermediate member 105 swings around the supporting shaft 106, the surface of the lock intermediate member 105 is only required to swing between an upwardly inclined position as shown in FIG. 22 and an almost horizontal position as shown in FIG. 23. Thus, the lock intermediate member 105 is held by a stopper, not shown, provided in the casing of the image reading device 30 at the horizontal position of FIG. 23 not to further swinging downward. Accordingly, the lock intermediate member 105 can either contact the cam shape portion 109 of the operation member 108 or slightly separates therefrom at the almost horizontal position of FIG. 23. Further, since the lock intermediate member 105 does not protrude downwardly from the lower surface of the image reading device 30, (i.e., a slide surface) when the stopper is provided as above, a problem of hardly smoothly sliding due to the protrusion can be resolved.

Figure 26:
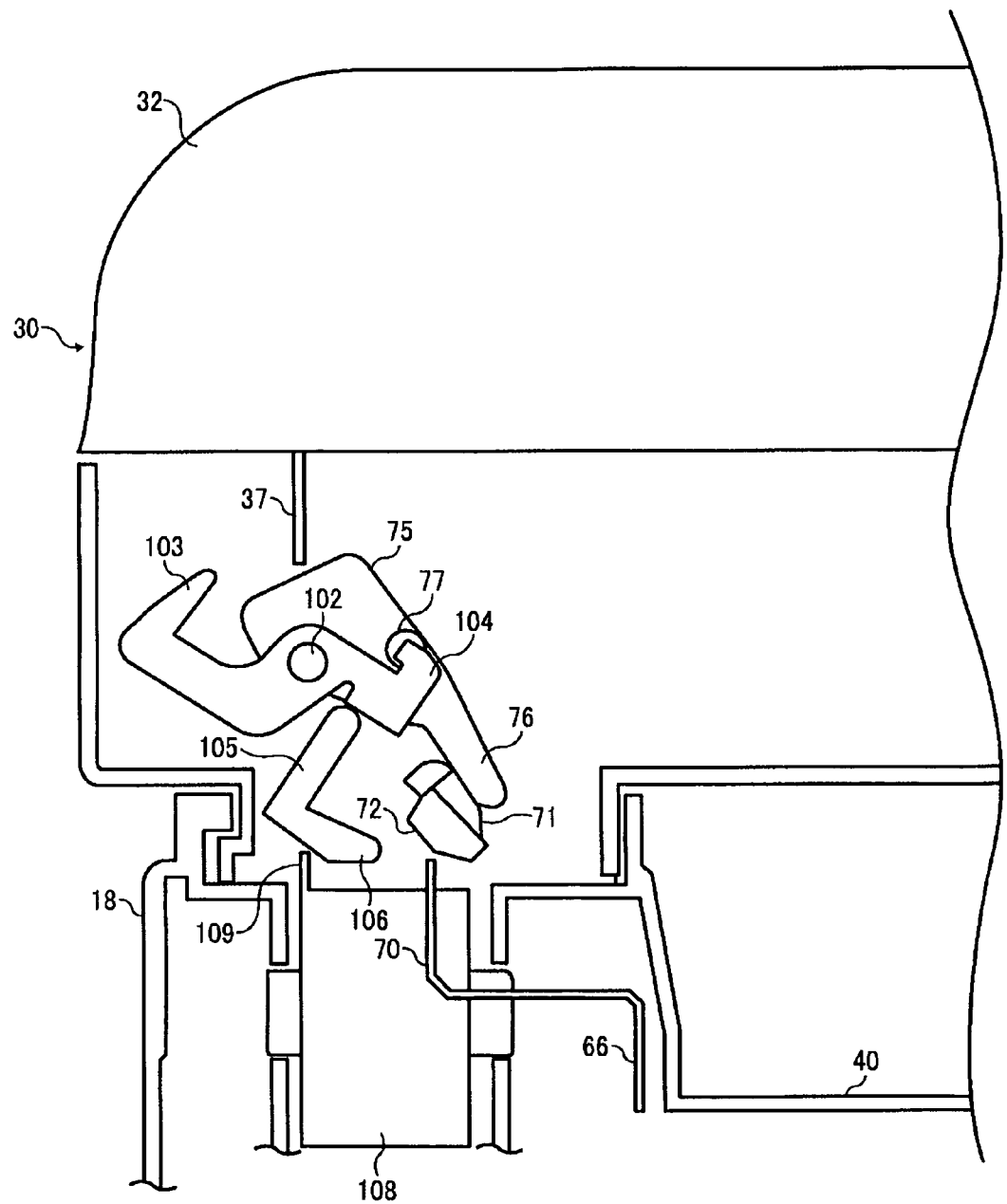
FIG. 26 is a cross sectional view illustrating a first supporting section and an exemplary positional relation between the lock device that prevents the upper cover member from being open when a platen cover is open and a platen lock device when viewed from the front side of the apparatus.

FIG. 26 is a cross sectional view that illustrates both of a first supporting section 50 when viewed from the front side of the apparatus and an exemplary positional relation between a lock device that prevents a upper cover member 18 from being open when the platen cover 31 is open and the platen lock device 100.

Within the width of the upper cover member 18, there are provided a convex section 70 engaging with the lower surface 72 of the unlock member 71, a lengthy lever 65, an operation member 108 engaging with the lock intermediate member 105, and a cam shape portion 109 in both left and right directions. Further the lengthy lever 65 is arranged along the surface of the sheet placing section 18a of the upper cover member 18 in an apparatus front and rear side direction.

Whereas in the image reading device 30, an unlock member 71 and the lower surface 72 engaging with the convex section 70, a lock intermediate member 105 swingably engaging with the cam shape portion 109 of the operation member 108 are arranged without interfering with each other. Further, the operation member 75 is backwardly deviated from the lock claw 103 not to interfere therewith.

The lock intermediate member 108 inclines clockwise as shown in the right upper portion of the drawing while contacting the cam shape portion 109 as described with reference to FIG. 26. As a result, the lock claw 103 deviates from an aperture of the protrusion member 37. Specifically, the automatic document feeding device 32 can be open.

Figure 27:
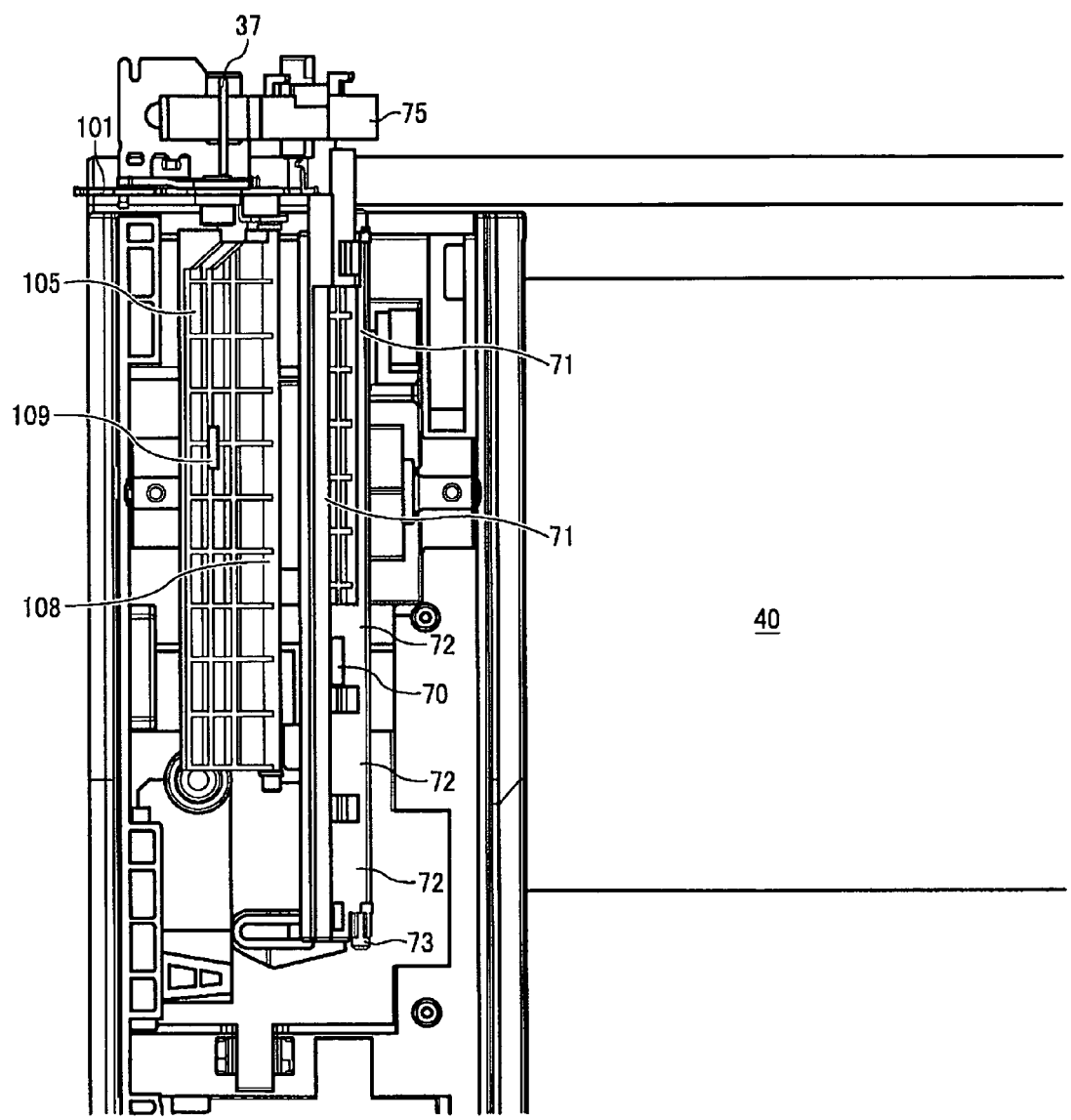
FIG. 27 is a plan view of the first supporting section of FIG. 23.

FIG. 27 illustrates a plan view of the first supporting section 50 of FIG. 26. As apparent from FIG. 27, the intermediate lock member 105 and the unlock member 71 are swingably arranged in a left and right direction side by side in the leg of the image reading device 30 within the first supporting section 50. Further, the lock member 101 and the operation member 75 position on the rear side of the apparatus body 1 in the image reading device 30 (i.e., outside of the carriage 130 in FIG. 28). Further, the protrusion member 37 is arranged on the platen cover 31 as shown in FIG. 28, and extend to the operation member 75 and the lock member 101 when the platen cover is closed on the image reading device 30 as shown in FIG. 25.

Thus, the protrusion member 37 includes a function of prohibiting and allowing the platen cover 31 to open by engaging and disengaging with the lock member 101 and that of prohibiting and allowing the upper cover member 18 to open by engaging and disengaging with the operation member 75.

Since the protrusion member 37 engages with the operation member 75 arid a positional relation between the lower surface 72 and the convex section 70 come to a condition as shown in FIG. 5 when the platen cover 31 is closed as shown by a rigid line in FIG. 2, the upper cover member 18 is allowed to be open. Further, when the upper cover member 18 is swung as shown in FIG. 3, since the engagement condition between the cam shape portion 109 and the lock intermediate member 105 shown in FIG. 22 changes to that in FIG. 23, the platen cover 31 is prohibited to be open.

Further, it is well-known that the platen cover 31 is enabled to contact and separate in a up and down direction from and to a platen, not shown, to create parallel movement as a whole, so that the platen cover 31 can sufficiently depress a thick original document BO such as a book, etc., as shown in FIG. 28. For example, a hinge section 38 provided in the platen cover 31 fits into a hole 39 formed on the body of the image reading device 30. When a thick original document is used, the hinge section 39 moves up and down along the hole 39, so that the platen cover 31 floats from the platen as a whole and thereby capable of appropriately depressing the thick original document.

When the platen cover 31 floats and is swung in the same direction as the upper cover member 18 is open, the platen cover 31 can drop out from the body of the image reading device 30.

Then, the unlock member 71 is held at a lock position, because the protrusion member 37 dose not contact the operation member 75 when the platen cover 31 floats and depresses the book like thick original document. Accordingly, even when the platen cover 31 floats, the upper cover member 19 can be prohibited to open as in the case when the platen cover 31 is open.

ADVANTAGE

According to the present invention, the operation section is not secured when the original document depression member is open and the upper cover member is locked, and the unlock operation is made ineffective. Thus, rigidity of members including the operation section is not accurately needed by the image reading device can be provided at low cost.

Obviously, numerous additional modifications and variations of the present invention are possible in light of the above teachings. It is therefore to be understood that within the scope of the appended claims, the present invention may be practiced otherwise than as specifically described herein.

What is claimed is:

1. An image forming apparatus, comprising:
   an apparatus casing installing an image formation section;
   an upper cover member configured to swingably cover and uncover the apparatus casing;
   an image reading unit supported by the apparatus casing via the upper cover member, said upper cover member opening and closing together with the image reading unit;
   a lock device configured to maintain the upper cover member in a closed state and prohibit the upper cover member from opening;
   an unlock device configured to unlock the lock device and allow the upper cover member to open;
   an unlock operation section, configured to be operated and displaced by an operator and further configured to activate the unlock device to operate when the lock device is unlocked; and
   an unlock operation invalidating mechanism configured to invalidate an operation executed through the unlock operation section by interrupting transmission of the displacement of the unlock operation section to the lock device when unlock is prohibited.

2. The image forming apparatus as claimed in claim 1, wherein said image reading unit includes an original document depressing member configured to swingably open and close an original document placing surface in the same direction as the upper cover member, and wherein said unlock operation invalidating device invalidates the operation executed through the unlock operation section when the original document depressing member is open.

3. The image forming apparatus as claimed in claim 2, wherein said original document depressing member is configured to rise from the original document placing surface, and wherein said unlock operation invalidating mechanism is configured to invalidate the unlocking operation when the original document depressing member is rising from the original document placing surface.

4. The image forming apparatus as claimed in claim 3, wherein said unlock operation invalidating mechanism includes:
   a swinging member configured to swing between a non-unlock position where the transmission of the displacement of the unlock operation section to the lock device is interrupted and a unlock position where the transmission of the displacement is not interrupted;
   a swing operation member engaged with the swinging member at its one end and configured to activate the swinging member; and a linking member engaged with the other end of the swing operation member and configured to transfer one of the opening and rising movements of the original document depressing member to the swing operation member;

wherein said swinging member is swung by the swing operation member between the non-unlock and unlock positions in accordance with a condition of the original document depressing member.

5. The image forming apparatus as claimed in claim 4, wherein said image reading device is slidably movable by a prescribed length together with the linking member in relation to the upper cover member, wherein said swing operation member includes a lengthy member having a length more than the prescribed length, and wherein said linking member always engages with the lengthy member wherever the image reading device is slidably moved.

* * * * *